(12) United States Patent
Schmidt

(10) Patent No.: US 9,556,584 B2
(45) Date of Patent: Jan. 31, 2017

(54) EXCAVATOR WITH SIDE MOUNTED SILT FENCE INSTALLER

(71) Applicant: Stephen T Schmidt, Eatonville, WA (US)

(72) Inventor: Stephen T Schmidt, Eatonville, WA (US)

(*) Notice: Subject to any disclaimer, the term of this patent is extended or adjusted under 35 U.S.C. 154(b) by 0 days.

(21) Appl. No.: 15/090,599

(22) Filed: Apr. 4, 2016

(65) Prior Publication Data

US 2016/0326714 A1 Nov. 10, 2016

Related U.S. Application Data

(63) Continuation of application No. 12/895,280, filed on Sep. 30, 2010, now Pat. No. 9,303,386, which is a continuation-in-part of application No. PCT/US2009/038711, filed on Mar. 29, 2009.

(51) Int. Cl.

| | |
|---|---|
| *E02D 17/20* | (2006.01) |
| *E02F 3/96* | (2006.01) |
| *E02F 9/20* | (2006.01) |
| *E02F 9/16* | (2006.01) |
| *E02F 3/32* | (2006.01) |
| *E02F 3/76* | (2006.01) |
| *E01C 19/48* | (2006.01) |
| *E01C 19/42* | (2006.01) |
| *E01C 19/25* | (2006.01) |
| *E02F 3/815* | (2006.01) |
| *F16L 3/01* | (2006.01) |
| *E02F 3/80* | (2006.01) |

(52) U.S. Cl.
CPC ............... *E02F 3/964* (2013.01); *E02D 17/20* (2013.01); *E02F 9/166* (2013.01); *E02F 9/2037* (2013.01); *E01C 19/25* (2013.01); *E01C 19/42* (2013.01); *E01C 19/4886* (2013.01); *E02F 3/325* (2013.01); *E02F 3/76* (2013.01); *E02F 3/80* (2013.01); *E02F 3/8155* (2013.01); *E02F 3/961* (2013.01); *E02F 3/967* (2013.01); *F16L 3/012* (2013.01)

(58) Field of Classification Search
CPC ........ E02F 3/3604; E02F 3/3609; E02D 17/20
USPC ......................................................... 37/403
See application file for complete search history.

(56) References Cited

U.S. PATENT DOCUMENTS

| | | | | | |
|---|---|---|---|---|---|
| 4,720,212 | A | * | 1/1988 | Steenbergen | E02D 19/18 405/176 |
| 5,685,668 | A | * | 11/1997 | Justice | E02F 5/06 405/129.6 |
| 6,158,923 | A | * | 12/2000 | Wheeler | E04H 17/261 256/12.5 |
| 6,517,294 | B2 | * | 2/2003 | Vreeland | E02D 17/202 173/184 |
| 6,945,739 | B1 | * | 9/2005 | Putman | E02D 19/18 405/15 |
| 7,044,689 | B1 | * | 5/2006 | McCormick | E02F 5/101 172/720 |

(Continued)

*Primary Examiner* — Gary Hartmann

(57) ABSTRACT

An excavator machine with a side mounted silt fence installing tool mounted below the swivel. The excavator has a swiveling and articulating tool and an operator's seat above the swivel. An articulating arm is attached above the swivel so the operator may operate swiveling and articulating tool in a coordinated way with the silt fence installer to accomplish a job more efficiently than it could be accomplished using tools separately mounted one at a time.

4 Claims, 26 Drawing Sheets

(56) References Cited

U.S. PATENT DOCUMENTS

| | | | | |
|---|---|---|---|---|
| 7,144,202 | B2* | 12/2006 | McCormick | E02F 5/101 172/720 |
| 7,624,520 | B2* | 12/2009 | Gordon | E02F 3/841 172/815 |
| 7,650,708 | B2* | 1/2010 | Gordon | E02F 3/7609 172/815 |
| 7,758,285 | B2* | 7/2010 | O'Dell | E02F 5/027 172/720 |
| 7,762,745 | B1* | 7/2010 | Burchland | E02D 17/20 172/720 |
| 8,205,359 | B2* | 6/2012 | Gordon | E02F 3/7609 172/815 |
| 9,051,718 | B2* | 6/2015 | Schmidt | E02F 3/325 |
| 9,303,386 | B2* | 4/2016 | Schmidt | E02F 3/325 |
| 2006/0230646 | A1* | 10/2006 | Schmidt | E02F 3/841 37/381 |
| 2007/0033840 | A1* | 2/2007 | Schmidt | E02F 3/841 37/383 |
| 2011/0116865 | A1* | 5/2011 | Schmidt | E02F 3/7609 404/72 |
| 2015/0139716 | A1* | 5/2015 | Schmidt | E02F 3/3686 403/72 |
| 2016/0010310 | A1* | 1/2016 | Schmidt | E02F 3/325 701/2 |

* cited by examiner

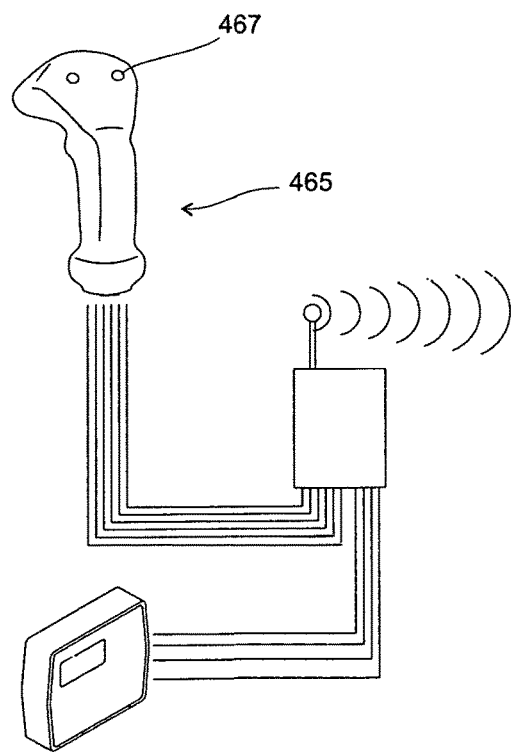
Fig. 4A
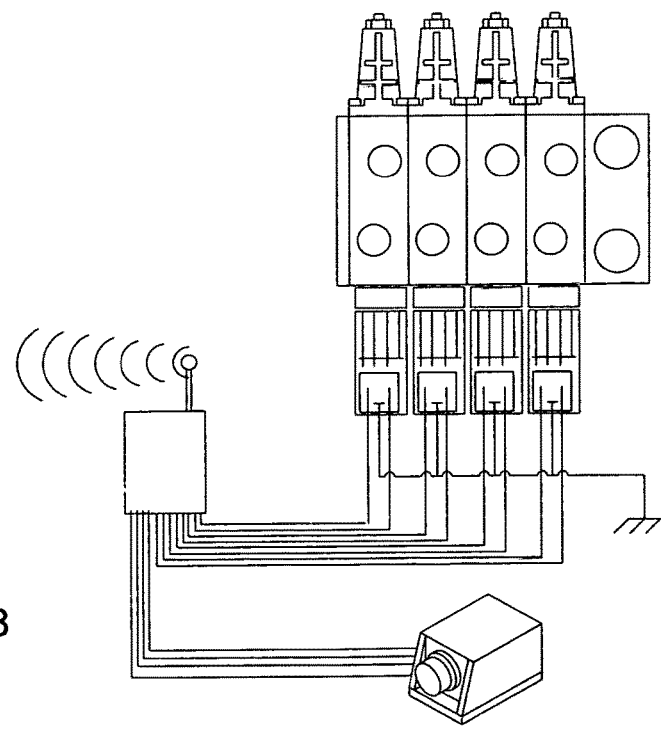
Fig. 4B

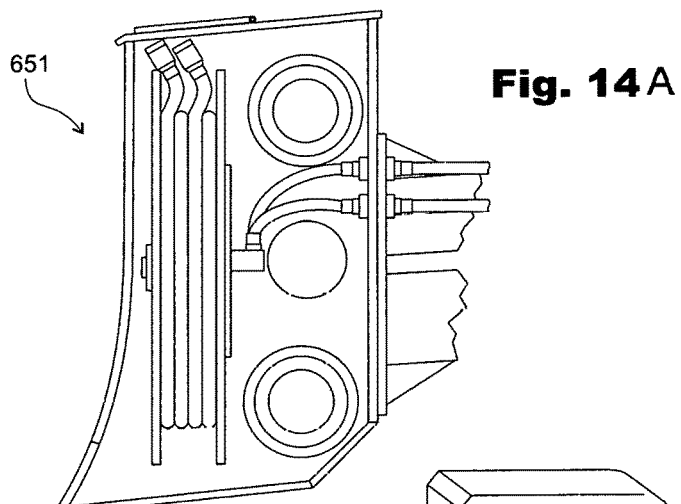
Fig. 14A
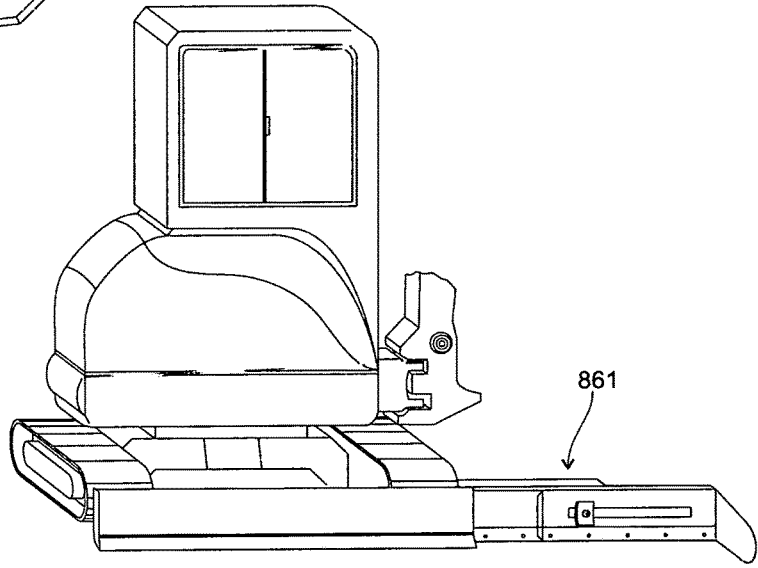
Fig. 14B
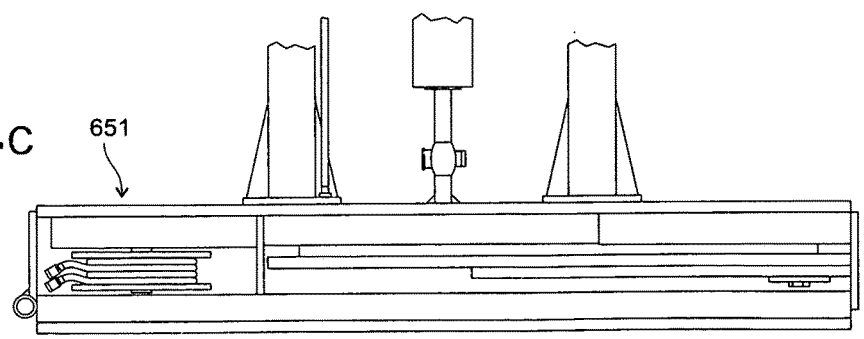
Fig. 14C

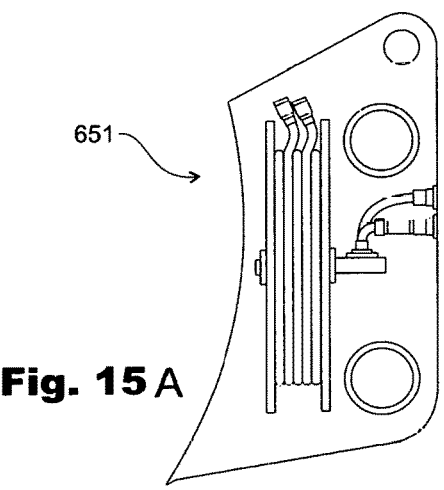
Fig. 15A
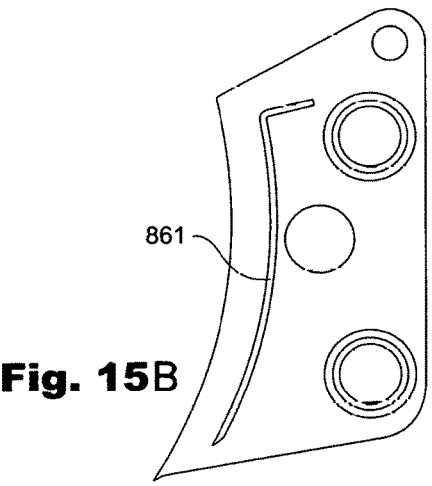
Fig. 15B
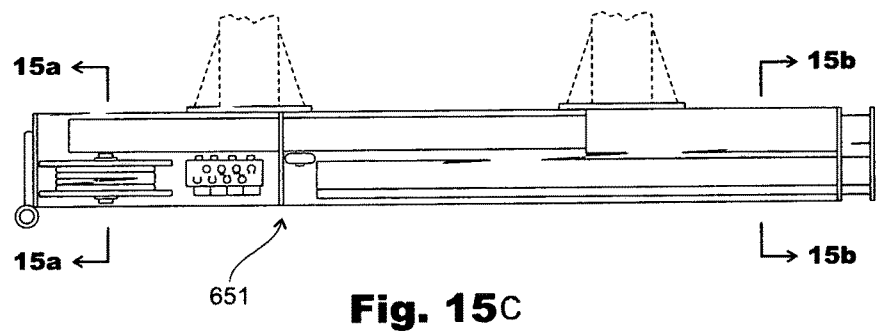
Fig. 15C
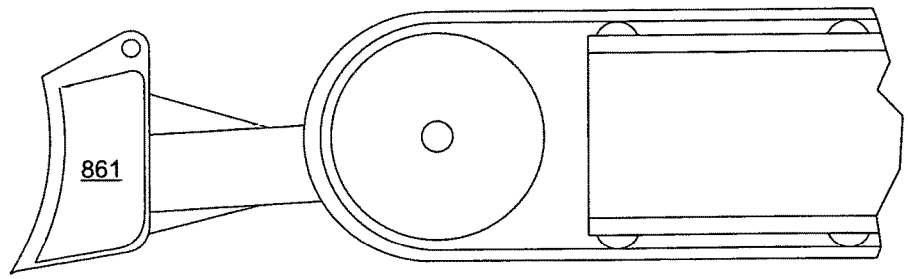
Fig. 15D

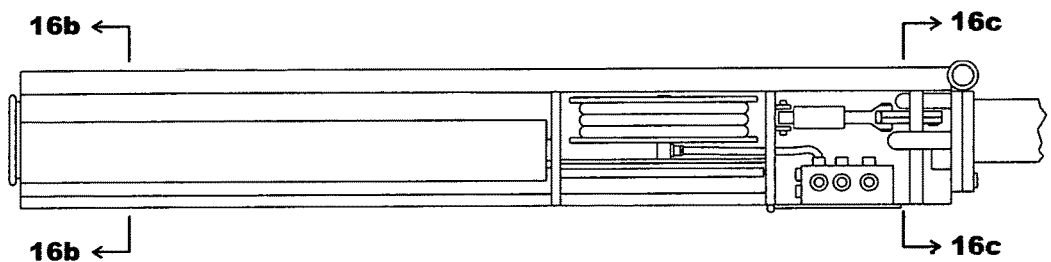
Fig. 16A
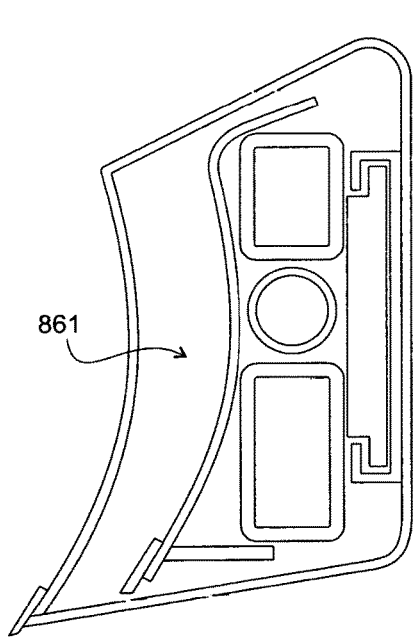
Fig. 16B
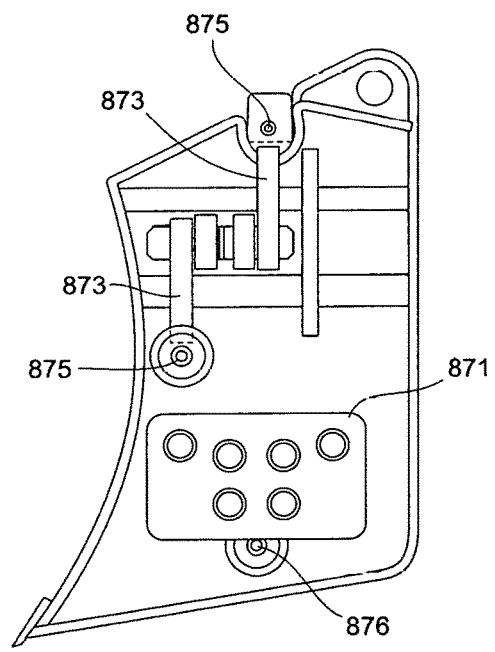
Fig. 16C

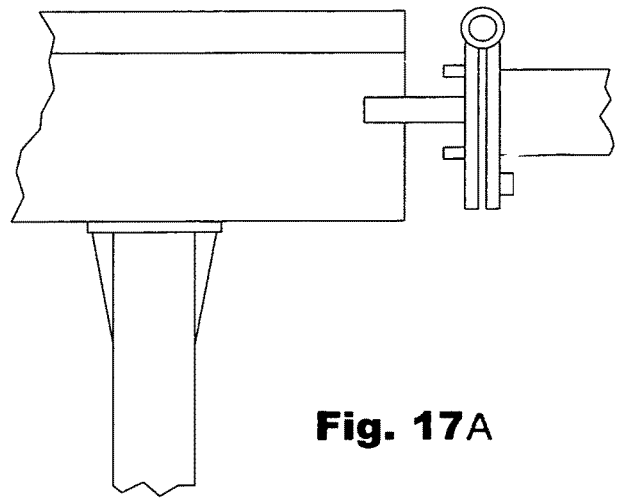
Fig. 17A
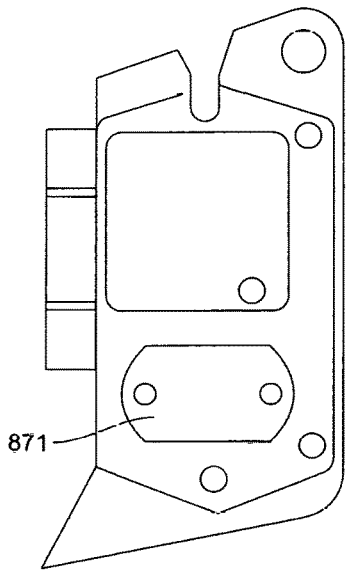
Fig. 17B
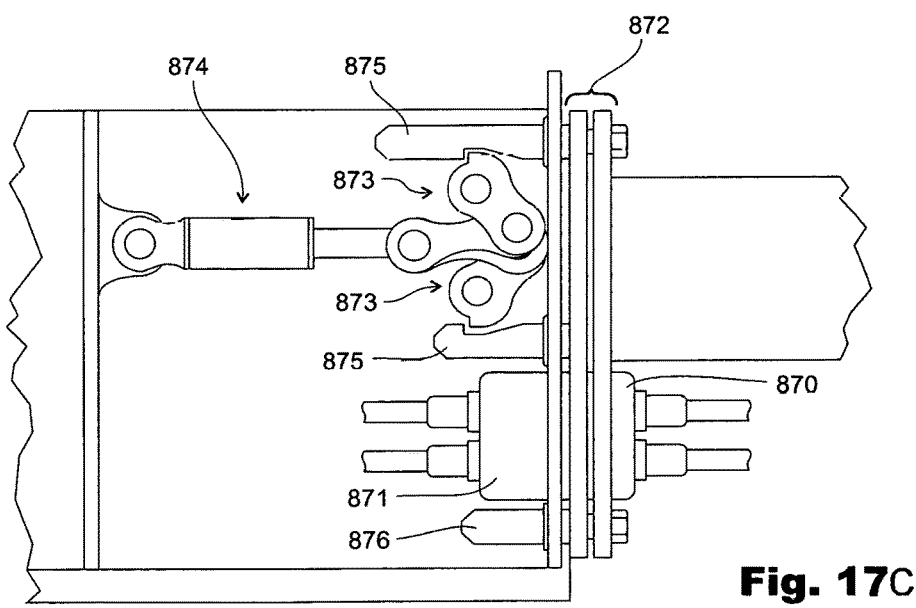
Fig. 17C

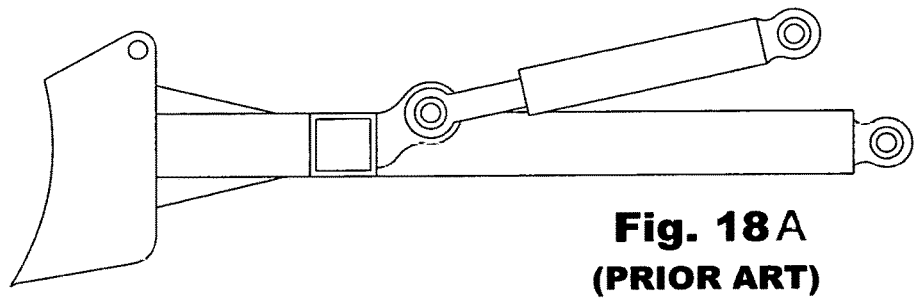
Fig. 18A
(PRIOR ART)
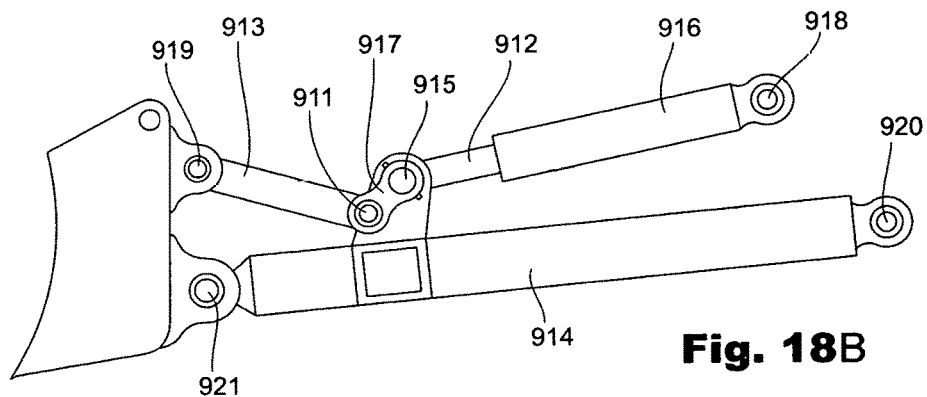
Fig. 18B
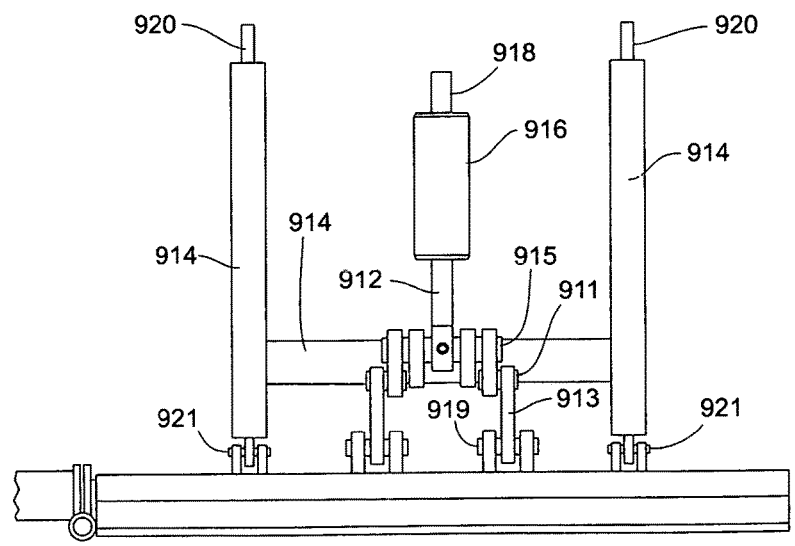
Fig. 19

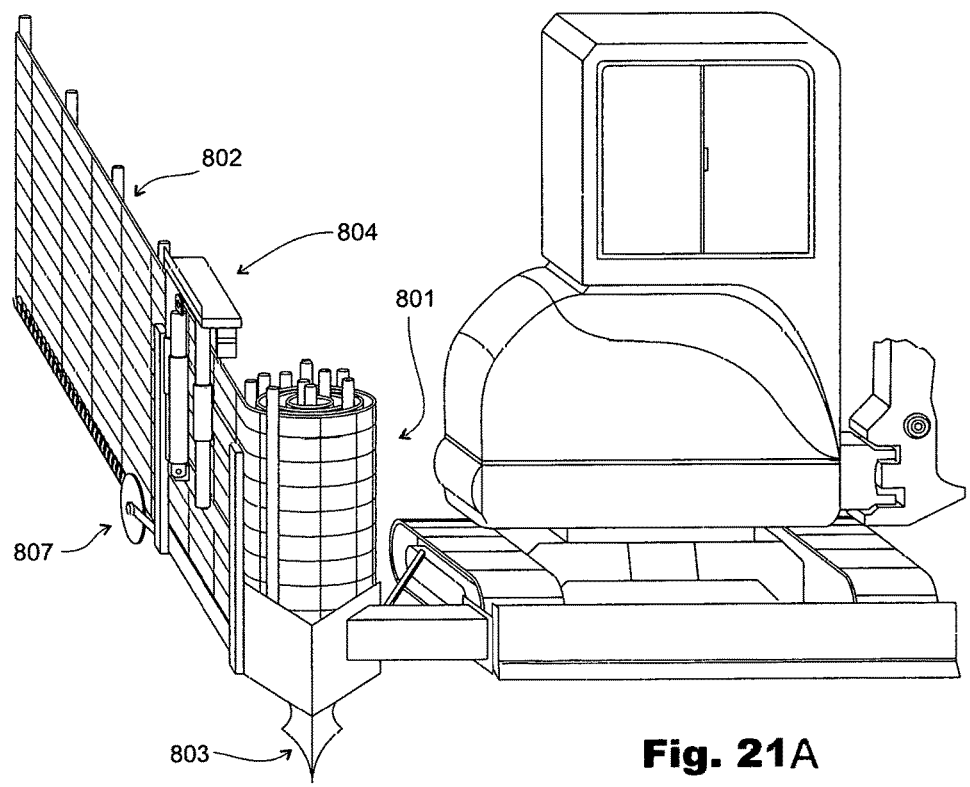
Fig. 21A
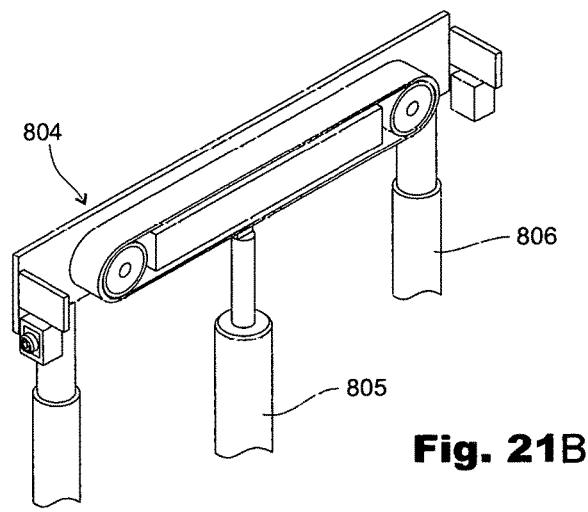
Fig. 21B

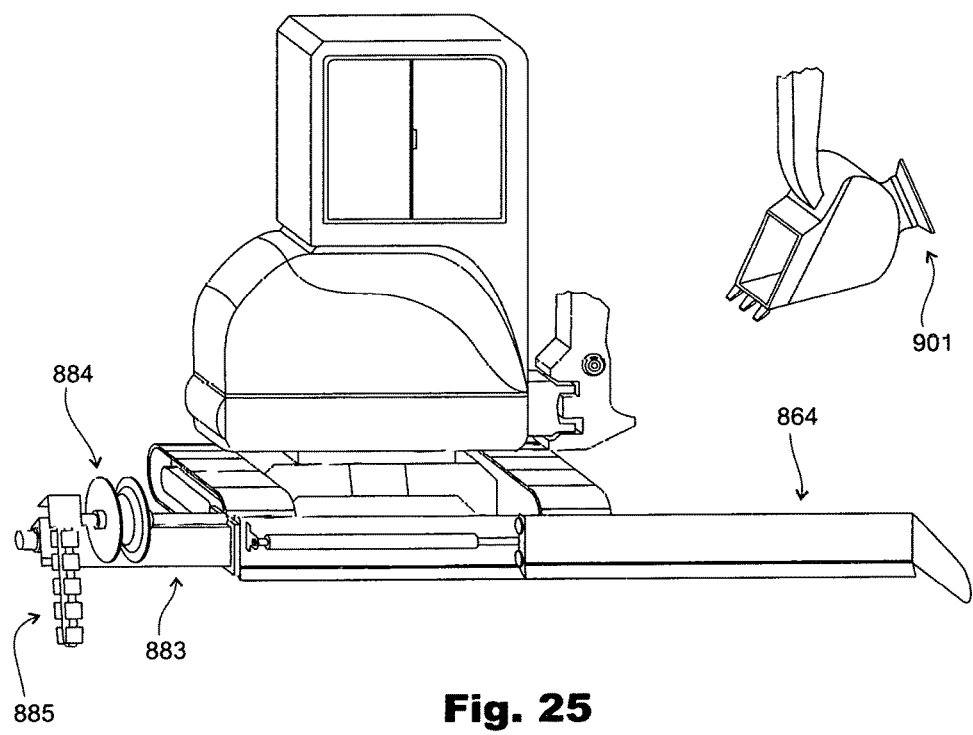
Fig. 25
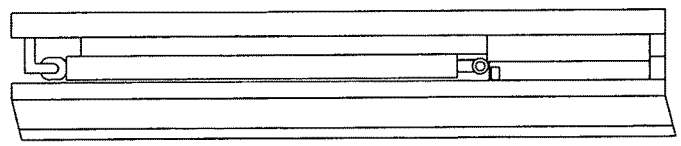
Fig. 26A
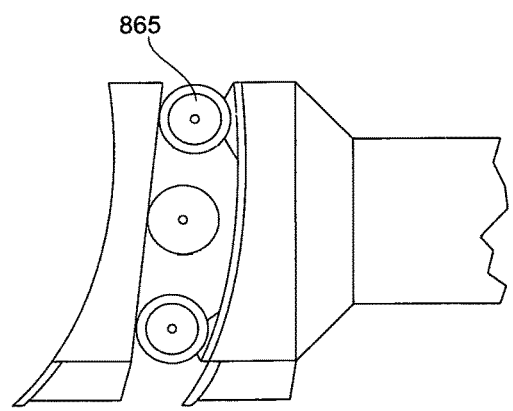
Fig. 26B

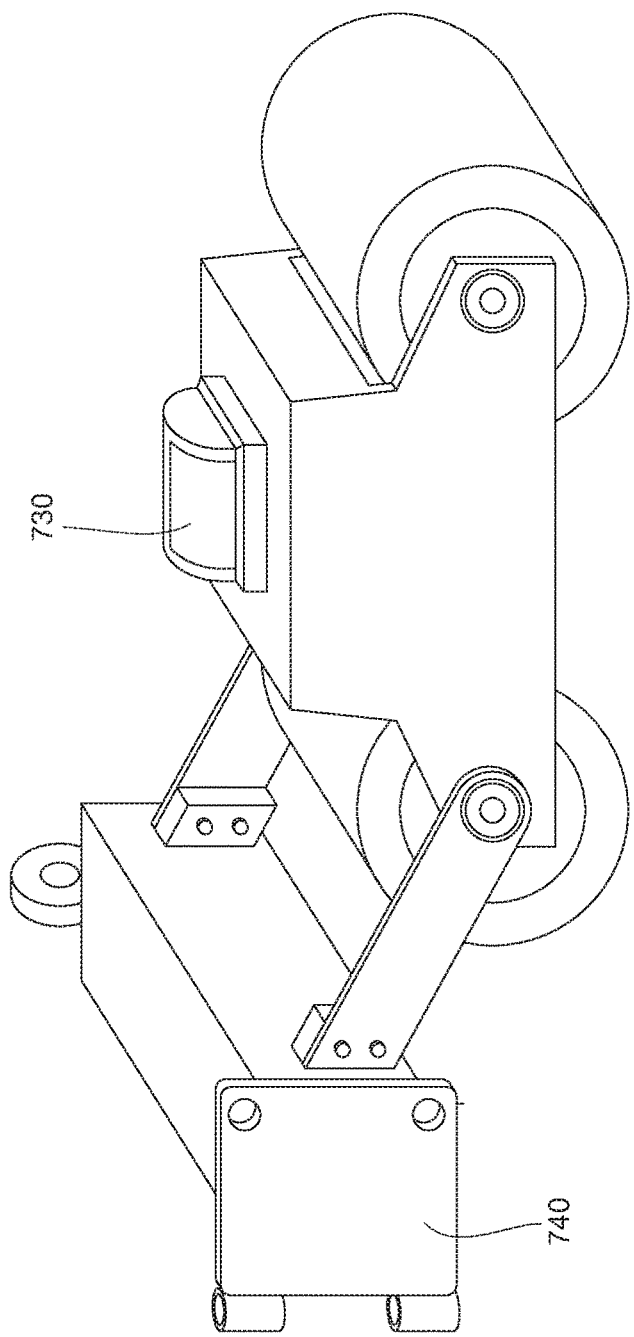

EXCAVATOR WITH SIDE MOUNTED SILT FENCE INSTALLER

This application is a continuation of U.S. patent application Ser. No. 12/895,280 filed Sep. 30, 2010 which was a continuation-in-part of PCT/US 2009/038711 filed Mar. 29, 2009.

INTRODUCTION

Machines originally designed as front end loaders with tracks or wheels, whether having skid-steering wheels or turnable wheels, such as Bobcat brand machines, have been adapted to become general purpose tool carriers that can receive a variety of controllable tool attachments to be attached to the front or back of the machine and controlled by an operator sitting in the operator's seat. This tool attachment carrying system can be improved upon by (1) allowing linear acting tools to be attached on the side, (2) placing the operator's seat and controls on a controllable swivel 10 so that the operator can swivel to an optimum location for viewing the work, and (3) providing the operator with a controllable articulating arm 11 with a bucket, claw, rake or compactor or similar implement which the operator can operate to accomplish a task in a coordinated fashion with the linear acting tool which is attached below the swivel. The engine may also be above the swivel, in which case it drives a hydraulic pump that pumps fluid through the swivel to drive the linear acting tool attached below the swivel. So that the swivel can rotate without limitation, electrical control signals may pass through conductor rings in the swivel or via wireless radio signal to the linear acting tool, or additional hydraulic circuits may be added passing through the swivel. The linear acting tool may be hydraulically adjusted in response to operator controls or location of a string datum line or a curb or gutter or GPS coordinates. The adjustment may move the tool vertically without pivoting to stay plumb or it may pivot the tool about a pivot point.

SUMMARY OF THE INVENTION

In one aspect, the invention is a tool carrying and controlling system wherein an operator can control a swiveling tool and either a first linear acting controllable tool or a second linear acting controllable tool to operate in coordination with the first tool. The system comprises (a) a set of wheels or tracks on which the machine rides supporting a support structure; (b) coupled to and supported by the support structure, an operator's seat and operator's controls; (c) coupled to and supported by the support structure, a vertical swivel 10 such that components coupled to an upper side of the swivel can swivel about a vertical axis relative to the support structure; (d) an articulating arm 11 coupled to the upper side of the vertical swivel, controllable by the controls, with a first tool mounted on a distant end of the arm; (e) coupled to and supported by the support structure and fixed to a lower side of the swivel, a mounting support 66 for mounting to one side of the path of the tracks or wheels a linear acting tool; (f) a first linear acting tool mountable on the mounting base 66, the first tool or mounting base including moving parts such that an operator can, using controls at the operator's seat, control the swiveling tool and, also using controls at the operator's seat, control the moving parts of the first tool or mounting base, which does not swivel with the swiveling tool, so that the two tools perform an operation in coordination with each other; and (g) a second linear acting tool mountable on the mounting base 66, the second tool or mounting base including moving parts controllable by the controls such that an operator can remove the first tool and replace it with the second tool and then, using controls at the operator's seat, control the swiveling tool and, also using controls at the operator's seat, control the moving parts of the second tool or mounting base, which does not swivel with the first tool, so that the two tools perform an operation in coordination with each other.

The above elements (a) through (d) may be provided by an excavator, particularly a mini-excavator. So that the swivel 10 can fully swivel any number of rotations without limitation, the system may include an electrical circuit coupling the controls with the moving parts of the mounting support or first or second tool, the electrical circuit passing through the swivel via electrical conductor rings and brushes. Alternatively, the control signals may be communicated with a wireless link that carries radio communications from the controls to the mounting support or first of second tool. In this case, electrical power to operate a wireless communication component coupled to the mounting support or first of second tool may be provided by a hydraulic generator which receives power from flow of hydraulic fluid passing through the swivel from a hydraulic pump on the engine mounted above the swivel.

The swiveling tool may be an earth moving bucket 43 or a claw or a rake or vibratory compactor or any similar implement. The first and second linear acting tools may be any of: a curb and gutter grading blade; a curb and gutter extruder; a sidewalk and shoulder grading blade; an asphalt paver; a concrete paver; a fence installer; a trencher; a concrete/asphalt saw; a side roller/compactor; a vibratory roller; a snow plow; and other similar tools.

In another aspect, the invention is a side tool carrying and controlling machine in the form of a modified excavator, comprising a common excavator, which is: (a) a set of wheels or tracks on which the machine rides supporting a support structure; (b) coupled to and supported by the support structure, a vertical swivel 10 such that components coupled to an upper side of the swivel can swivel about a vertical axis relative to the support structure; (c) coupled to and supported by the upper side of the swivel, an operator's seat, operator's controls, and an articulating arm having a tool on a distant end. The modification consists of: (d) coupled to and supported by the support structure and fixed to a lower side of the swivel, a side tool mounting support 66 adapted for mounting a linear acting tool to one side of a path of the wheels or tracks; (e) a set of source side hydraulic couplers disposed proximate to the mounting support and available for use with mating hydraulic couplers of a hydraulically controlled side tool, each source side coupler coupled to a hydraulic pump disposed above the swivel via hydraulic lines having control valves that control flow through the lines in response to actuation at the operator's controls.

The side tool carrying and controlling machine may be designed to fully swivel any number of rotations without limitation by ensuring that any hydraulic or communication circuits pass through the swivel with slip fittings or use wireless radio.

The side tool carrying and controlling machine may further include a hydraulic actuator coupled to the mounting support and configured for adjusting the support or an attached linear acting tool in response to a control, which may be an operator control or an automated control that responds to location relative to a string datum line or that responds to a slope sensor or that responds to position with respect to global positioning system satellites.

In yet another aspect, the invention is a curb and gutter extruding machine made by modifying a common excavator, which is a set of wheels or tracks on which the excavator rides supporting a support structure; coupled to and supported by the support structure, a vertical swivel 10 such that components coupled to an upper side of the swivel can swivel about a vertical axis relative to the support structure; coupled to and supported by the upper side of the swivel, an operator's seat, operator's controls, and an articulating arm 11 having a tool on a distant end. The modification consists of: coupled to and supported by the support structure and fixed to a lower side of the swivel 10, a curb and gutter extruder attachment comprising a hopper and a slip form mounted to extrude a curb or gutter to one side of a path of the wheels or tracks.

The curb and gutter extruder may further comprise a hydraulic actuator coupled to a hydraulic valve that is automatically controlled by a controller that adjusts height of the extruder relative to one of: location with respect to a datum line string, tilt with respect to gravity, or location with respect to global positioning system satellites.

The curb and gutter extruder may be mounted to an attachment base 66 on the excavator which may be a typical front blade of the excavator. It may be braced by a diagonal brace to a track roller chassis of the excavator.

In yet another aspect, the invention is a sidewalk paving machine made by modifying a common excavator, the modification comprising: coupled to and supported by the support structure and fixed to a lower side of the swivel, a sidewalk paving attachment comprising lateral material retaining fins, a spreading auger and a smoothing plate with a vibrator mounted to spread and smooth formable paving material to one side of a path of the wheels or tracks.

The sidewalk paving machine may include one or more heating elements on the smoothing plate to heat asphalt paving material. It may further include at least one curb follower attached to a side of a material retaining fin to maintain proper height relative to a curb. The paving attachment may be mounted to a blade of the excavator. It may include a diagonal brace to a track roller chassis of the excavator.

In yet another aspect, the invention is a sidewalk grading machine with vertical blade adjustment made by modifying a common excavator, the modification comprising: coupled to and supported by the support structure and fixed to a lower side of the swivel, a sidewalk grading blade attachment with a straight vertical adjusting component, the vertical adjusting component comprising: (1) an excavator side attachment fitting, coupled to (2) a set of vertical tracks, which are engaged by (3) a set of vertical sliders, which are attached to the grading blade, and (4) a hydraulic actuator that adjusts vertical sliding of the sliders on the tracks, thereby vertically adjusting the height of the grading blade.

The sidewalk grading machine may further comprise a sonar position detector that detects position of a datum line relative to the detector which detected information is used to adjust the vertical adjusting component. The datum line may be a string or a concrete curb or gutter or a laser line or plane, a road surface, or an established grade.

In yet another aspect, the invention is a sidewalk or shoulder rolling machine, comprising (a) a common excavator comprising a set of wheels or tracks on which the excavator rides supporting a support structure; coupled to and supported by the support structure, a vertical swivel such that components coupled to an upper side of the swivel can swivel about a vertical axis relative to the support structure; coupled to and supported by the upper side of the swivel, an operator's seat, operator's controls, and an articulating arm having a tool on a distant end; and (b) coupled to and supported by the support structure and fixed to a lower side of the swivel, a side roller attachment comprising a frame, which supports at least one axis which holds at least one weighted cylindrical roller located to roll an approximately horizontal surface to one side of a path of the wheels or tracks. The rolling machine may include a vibrator on the frame located to vibrate the at least one roller.

In yet another aspect, the invention is a silt fence installing machine, comprising: (a) a common excavator comprising a set of wheels or tracks on which the excavator rides supporting a support structure; coupled to and supported by the support structure, a vertical swivel such that components coupled to an upper side of the swivel can swivel about a vertical axis relative to the support structure; coupled to and supported by the upper side of the swivel, an operator's seat, operator's controls, and an articulating arm having a tool on a distant end; and (b) coupled to and supported by the support structure and fixed to a lower side of the swivel, a silt fence installing attachment comprising a frame, which supports a fence roll support bar for holding a roll of fencing, a plowing edge, and following the plowing edge, a diagonal direction changing edge which redirects the fabric from vertical movement to horizontal movement. The silt fence installing machine may include at least one height adjustable wheel or skid that contacts an earth surface and limits a depth of plowing of the plowing edge.

In yet another aspect, the invention is a machine for installing rolled-up fencing with attached posts, comprising: (a) an attachment mount adapted to attach to an attachment base on a mobile machine; (b) coupled to the attachment mount, a fence dispenser adapted to hold vertically a roll of fence material with attached fence posts and allow the fence material with posts to feed off the roll; (c) coupled to the attachment mount, a plowing edge adapted to plow a trench as the mobile machine moves forward; (d) a fence material guide adapted to guide fence material with posts coming off the roll into installation position as the mobile machine moves forward; and (e) a fence post pusher adapted to push each fence post from installation position into soil as the mobile machine moves forward. The tool may further comprise soil pushers adapted to push soil against a bottom edge of installed fence as the mobile machine moves forward.

In yet another aspect, the invention is a tool for installing rolled-up fencing without attached posts and digging holes for or pounding in fence posts, comprising: (a) at least one attachment mount adapted to attach to an attachment base on a mobile machine; (b) coupled to at least one attachment mount, a vertical sliding guide with a slider disposed with no obstruction on a vertical line from the slider to soil when the tool is mounted on a mobile machine; and (c) coupled to at least one attachment mount, a fence dispenser adapted to hold vertically a roll of fence material and allow the fence material to feed off the roll proximate the vertical line. The tool attachment system may further comprise a powered auger mountable on the slider adapted to drill a hole suitable for a fence post when sliding down the sliding guide. It may also comprise a pounding face mountable on the slider adapted to pound a fence post when sliding down the sliding guide and/or a fence stretcher.

BRIEF DESCRIPTION OF THE FIGURES

FIGS. 4A and 4B show wireless components for controlling a detachable tool from the cab.

FIGS. 14A, 14B, 14C, 15A, 15B, 15C, 15D, 16A, and 16B show a hydraulic hose reel adapted to carry two hydraulic hoses in the tool mounting base and a side blade which extends horizontally out of an end of the tool mounting base.

FIGS. 16C and 17A, 17B and 17C show a multi-coupling plate and how retainers of the tool mount may be powered with a hydraulic cylinder.

FIGS. 18A, 18B and 19 show arms connecting the tool attachment base to the machine that constrain the tool attachment base to move up and down without significant rotation out of plumb.

FIGS. 20, 21A, 21B and 22 show a silt fence installer attachments.

FIGS. 23, 24, 25, 26A and 26B show a horizontally extendable low profile side blade attachment.

FIG. 31 shows a roller attachment.

DETAILED DESCRIPTION

The Prior Art

Figure 1:
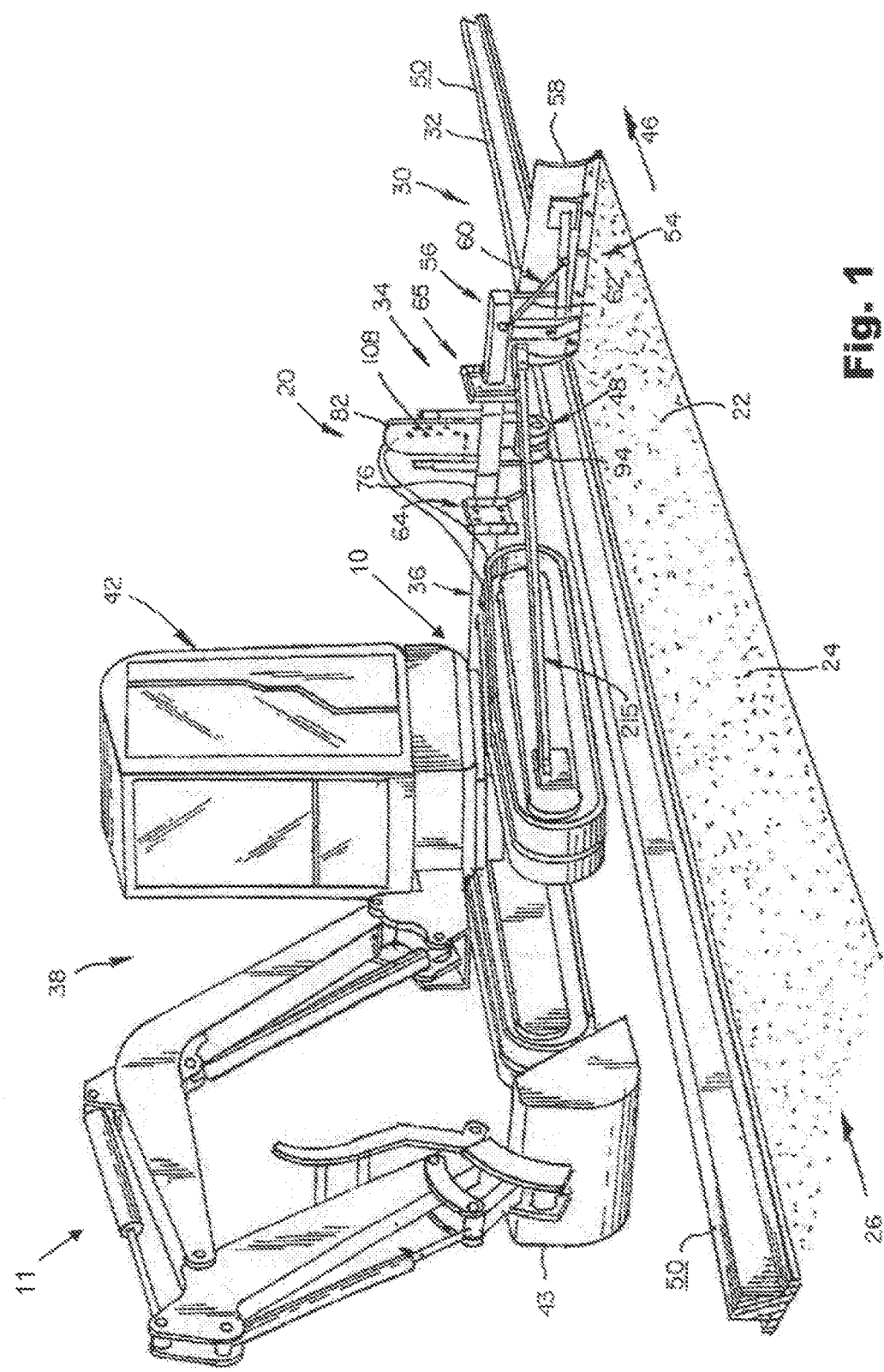
FIG. 1 shows a prior art sidewalk grader.

Referring to FIG. 1 of the drawings which shows the prior art sidewalk grading machine, numeral 20 generally designates the sidewalk grading blade and support structure, called the sidewalk grader 20. The sidewalk grader 20 is used to grade sidewalk base material 22, which sometimes includes crushed rock 24, to a predetermined specified grade and elevation to form the base 26 of a designed sidewalk (not illustrated). Typically, the sidewalk grader 20 accommodates grading activity for sidewalks that extend adjacent to and along an existing road structure 30 of the type that incorporates a curb 32 as a border.

More specifically, the sidewalk grader 20 comprises a tracking assembly 34 adapted for fixable engagement with a vertically movable accessory 36 extending from below the swivel in a piece of construction excavation equipment 38. Commonly, a vertically adjustable backfill blade extending from a common compact excavator 42 is effective 36 for this purpose. When a compact excavator 42 is used, the bucket 43 thereof, can be very useful to either remove or add additional sidewalk base material 22 depending on the condition of the site reserved for the sidewalk. In addition, as the sidewalk grader 20 advances along the road structure 30, the bucket 43 can be used to break-up native hard-pan type soil, and to remove large rocks and the like.

The construction equipment 38 is generally positioned to move forward over an existing road structure 30 to advance the sidewalk grader 20 in a direction along the existing road structure 30, substantially parallel thereto. This forward movement is indicated by arrow 46. Importantly, the excavation equipment 38 so provided is disposed and operated over an existing road structure 30 thereby minimizing the impact it has on the base 26. Accordingly, the tracking assembly 34 is configured to extend from the vertically movable accessory 36 in a transverse direction to the course of advancement (indicated by an arrow 46), transversely across the road structure 30 and the curb 32 thereof.

In addition, the tracking assembly 34 further comprises a vertically adjustable tracking means 48 disposed for engagement with the top surface of the curb 32 portion of the road structure 30. With this configuration, the top surface 50 of the curb 32 provides a point of reference for operation of the sidewalk grader 20.

A grading assembly 54 is mounted and fixed to the tracking assembly 34 so that the grading assembly 54 extends outward, beyond the curb 32, positioned over the location of the area reserved for the designed sidewalk and base 26 thereof. More specifically, the grading assembly 54 comprises a frame 56, and a grading blade 58 rotatingly mounted to the frame 56 to permit adjustment of slope of the grading blade 58 according to the specified sidewalk design grade. In order to lock or fix the rotation of the grading blade 58 in relation to the frame 56, according to a predetermined grade, a fixing means 60 for fixing the blade rotation is provided.

As noted above, the tracking means 48 is vertically adjustable. This feature is provided to enable the tracking means 48 to engage with the top surface 50 of a curb 32 to provide a relative reference, or point of reference, for precise vertical and horizontal adjustment of the sidewalk grader 20, to position the grading assembly 54, and for maintaining the grading assembly in the desired position in relation to the curb as the sidewalk grader 20 advances along the existing road structure 30 as indicated by arrow 46.

Because the top surface 50 of the curb 32 is usually rough concrete, the preferred tracking means 48 is constructed for rolling engagement along the top surface 50 of the curb 32, such as a wheel 94.

In a simplified embodiment of the sidewalk grader 20, the tracking assembly 34 comprises a pivot joint 64, disposed adjacent the backfill blade to enable the sidewalk grader 20 to fold from a first unfolded position to a folded position. An additional pivot joint 65 is provided to form an additional folding point to fold the sidewalk grader 20 for storage and transportation. As will be discussed more fully below, a second pivot joint 65 can provide an additional pivot axis for up and down movement of the grading assembly 54 to provide greater flexibility thereof.

A cylinder support 82 is fabricated from solid steel for strength and is welded directly to the support tube 76. At the top of the cylinder support 82 is an upper eye to provide a connection point for the upper portion of a vertical hydraulic cylinder. Similarly, at the opposing end, its ram is connected to a vertically movable wheel carriage having a wheel 94. With this arrangement, the ram 88 can be operated to vertically adjust the wheel 94 to the proper elevation to rest on the top surface 50 of curb 32 to track the curb 32 as the sidewalk grader 20 advances along the road structure 30. Adjusting the vertical hydraulic cylinder causes pivoting of the blade 58 rather than vertical movement of the blade.

As the sidewalk grader 20 advances along the road structure 30, the wheel 94 should be adjustable between a first lower limit and a second upper limit, thereby lowering the sidewalk grader 20 to enable the sidewalk grader 20 to follow the curb 32 as it drops to an area reserved for a driveway (not illustrated), i.e., where the curb transitions downward and fades into the driveway. This movement causes pivoting of the blade 58 in an arc, such that its distant end moves more than its nearer end, rather than vertical movement of the blade.

Figure 5:
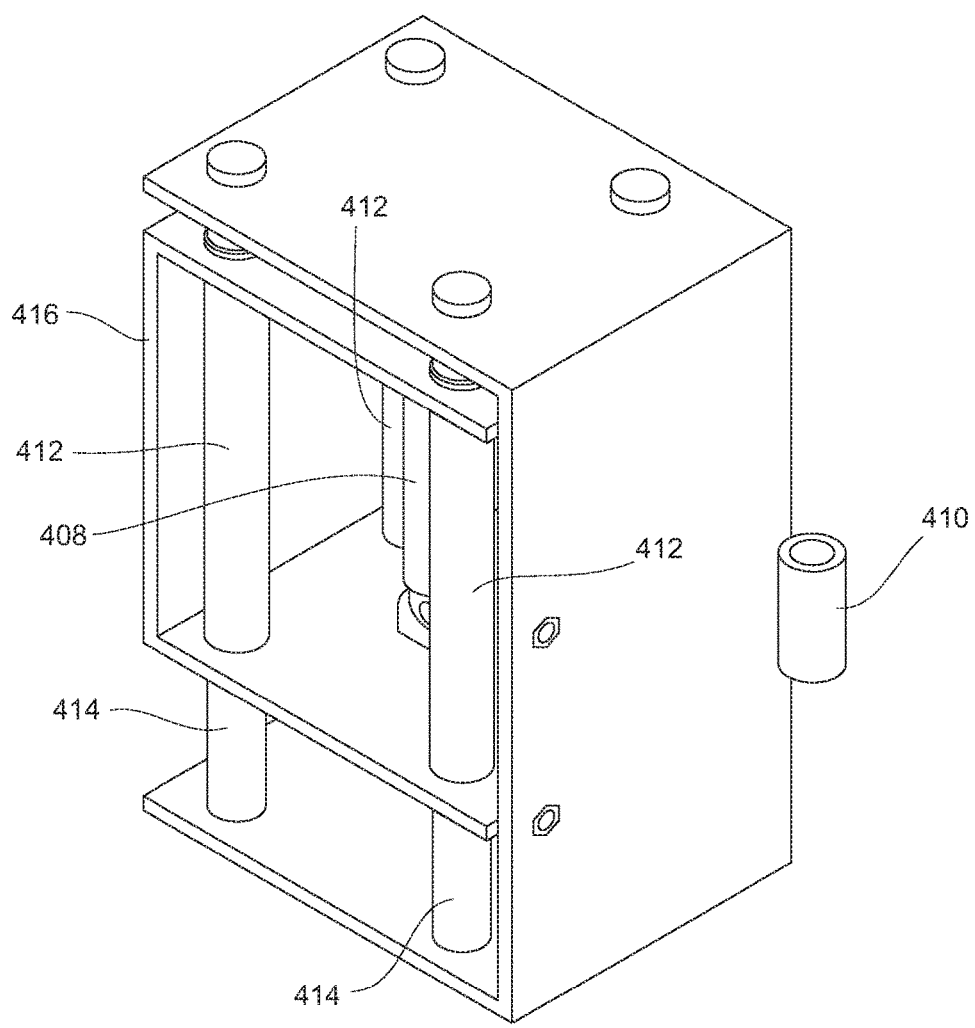
FIG. 5 shows an improvement that allows the detachable tool to remain plumb as relevant elevations change.

To compensate for the pivoting of the blade, as shown in FIG. 5, a slope control system including a slope sensor 220, a pivot 180, and a hydraulic cylinder 226 (all not shown in FIG. 1) were added to the prior art system. This slope control system compensates for any deviation in slope of the grading blade 58 caused by bumps in the road structure 30, change in slope of the road structure, and excavator load changes and the like. Accordingly, the slope sensor senses any change in slope and communicates the change to a control box which then signals an electronically controlled valve stack to activate the hydraulic slope control link to compensate for the change. In this way, the grading blade 58 is automatically controlled to provide a smoothly graded base 26 for the sidewalk.

Converting the Excavator to a Multi-Attachment Side Tool Carrier

Figure 2:
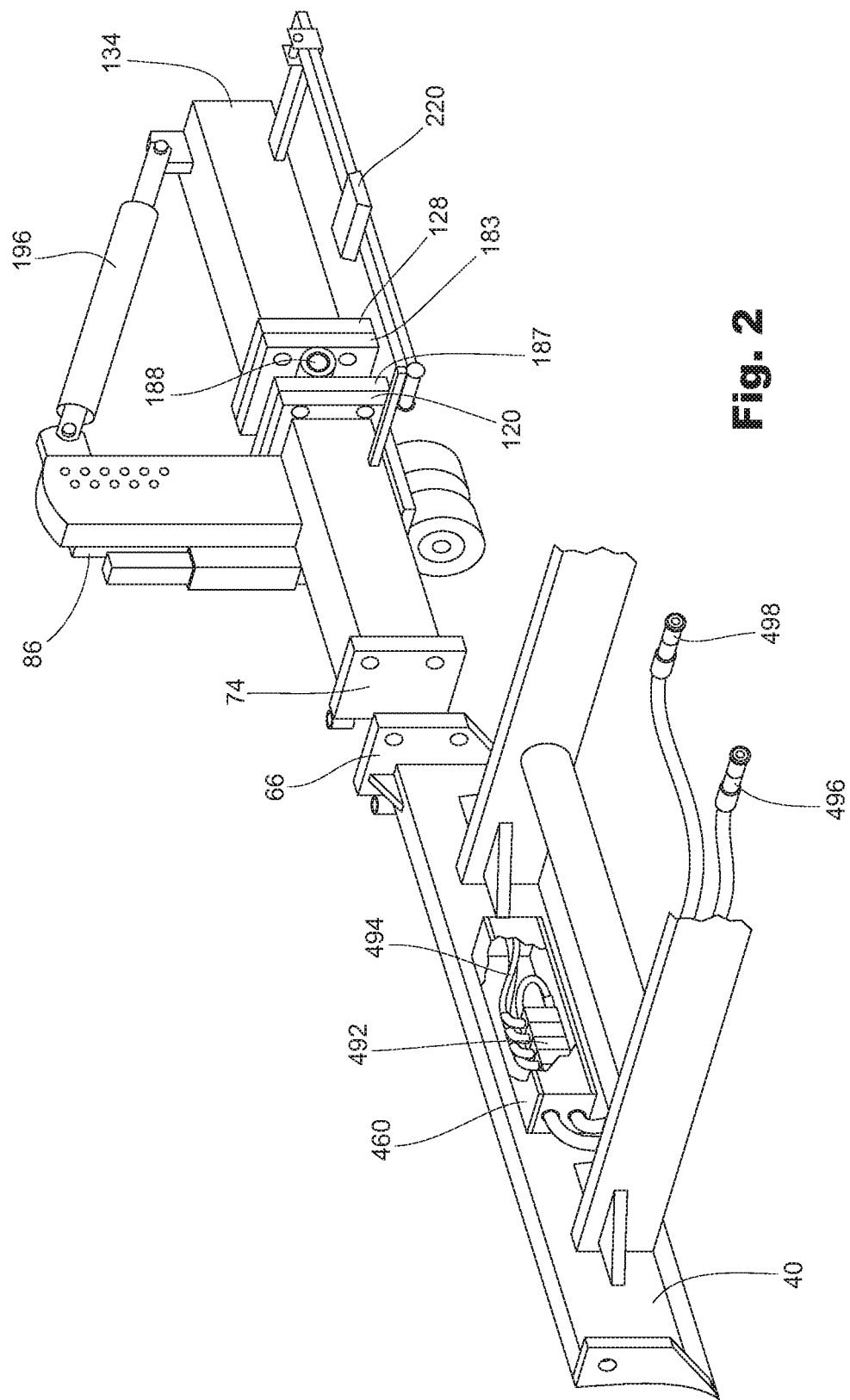
FIG. 2 shows a mounting base 66 and tool's mating attachment surface 74, as well as components of a tool that includes automatic leveling components.
Figure 3:
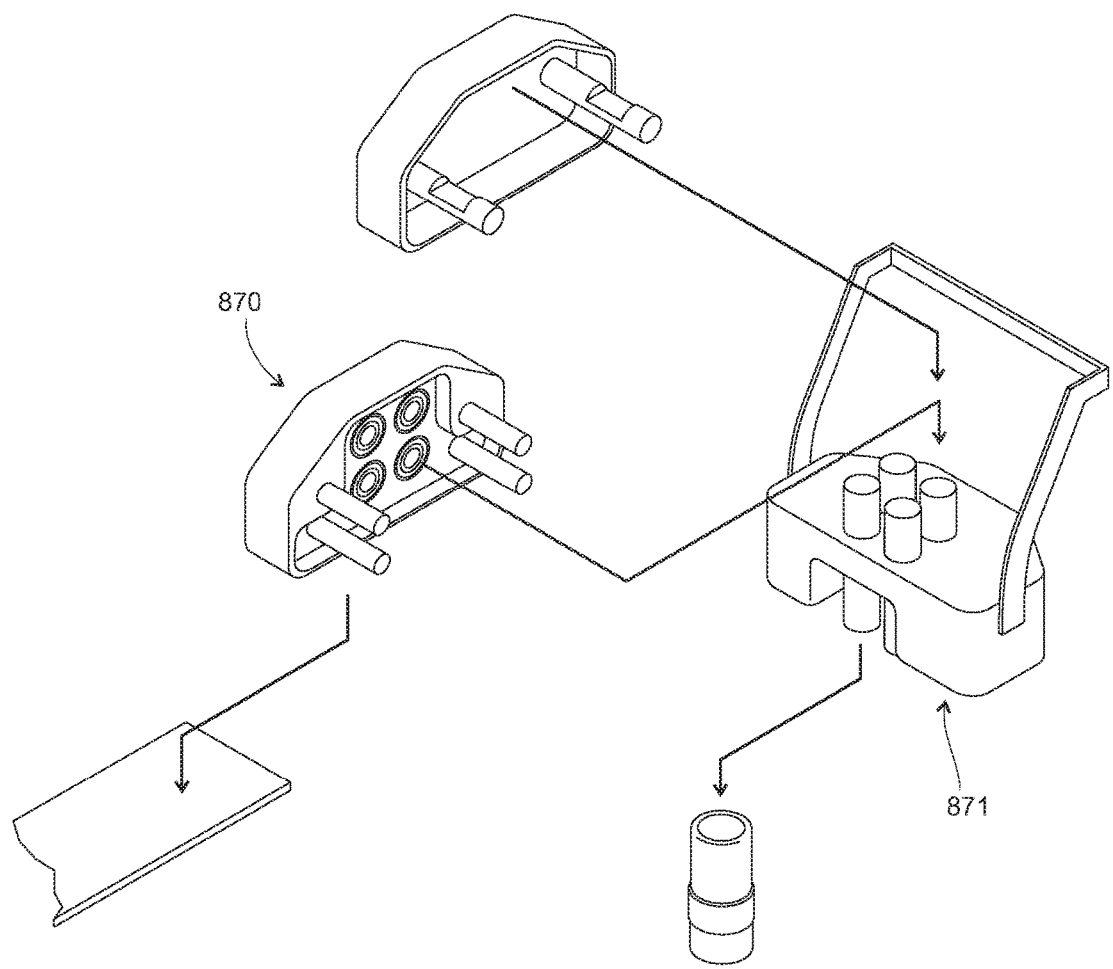
FIG. 3 shows a quick coupling components for coupling hydraulic lines to a detachable tool.

As described below, as an improvement over the above described prior art, the present invention encompasses a tool carrying and controlling system wherein an operator can control a swiveling tool and either a first attachable linear acting controllable tool or a second attachable linear acting controllable tool to operate in coordination with the first tool. For use in this system, the excavator is modified to include a side tool mounting base or support 66 affixed below the swivel 10 for attaching any linear acting tool via a mating surface 74, and a set of hydraulic line quick couplers 494 are mounted proximate to the side mounting base 66 as shown in FIG. 2. The couplers may be ganged as shown in FIG. 3. The quick coupler hydraulic connections may be color-coded to correspond to the function control buttons on a Suregrip handle 465 in the cab with corresponding colors as shown in FIG. 4A. Attachment hydraulic hoses may also have corresponding colors.

On the excavator, the two hydraulic hoses that operate the stock backfill blade are rerouted to an electronically controlled valve stack with proportional and/or on/off sections for supplying hydraulic pressure to any number of attachment hydraulic circuits. Accordingly, the tool support mount 66 on one end of the backfill blade is now connected to, and controlled by the valve stack. In this way, the operator can electronically control the valve stack from within the cab of the excavator, above the swivel 10, to control all hydraulic circuits below the swivel that effect any attachment function. The valve stack is located between the lower side of the swivel and the quick couplers, and any number of hoses are routed from the valve stack to the set of hydraulic couplers for the side attachment.

Electric control wires from the cab to the valve stack may couple the two together as in the prior art. However, this limits rotation of the swivel 10 and risks damaging the wires. An improvement is to pass the control wires through the swivel with slip rings, an electromechanical device that allows the transmission of power and electrical signals from a stationary to a rotating structure, also called a rotary electrical joint, collector or electric swivel.

Alternatively, A transmitter/receiver mounted in the cab can transmit all commands from an installed control handle mounted on the right or left joystick as well as any other switches or any controls in the machine's cab. A receiver/transmitter capable of driving the hydraulic valve stack decodes the signal and controls the valve stack. A hydraulic generator that is installed in the return hydraulic line generates power to keep a large capacitor charged. This capacitor supplies power to operate the electric control valves and supplies power to the wireless receiver/transmitter module. A battery may be used instead of a capacitor. The battery can be charged as mentioned above or removed each night and charged the conventional way.

As another alternative, instead of manifolding one hydraulic circuit into many with a control valve stack placed below the swivel 10 and then routing electric or wireless controls through or around the swivel, the excavator swivel can be modified to add more hydraulic circuits through the swivel, allowing the valve stack to be placed above the swivel.

As a further improvement to the prior art side tool system, a vertical slider, shown in FIG. 5, may be inserted into the beam structure between the excavator and the tool. This prevents relative vertical movement from inducing a pivoting movement. This slider may be inserted at joint 64 in FIG. 1. It retains the hinge feature of prior joint 64 to allow folding of the beam. The slider may be hydraulically actuated, as shown in FIG. 5, or it may slide by itself vertically, perhaps using the wheels on the curb or other datum line to force vertical movement. The vertical slider constrains the tool to move straight up and down and not swing in an arc, as in the prior art.

For use with this multi-tool carrier, several linear acting attachable side tools are described below.

Curb or Curb and Gutter Extruder

Figure 6:
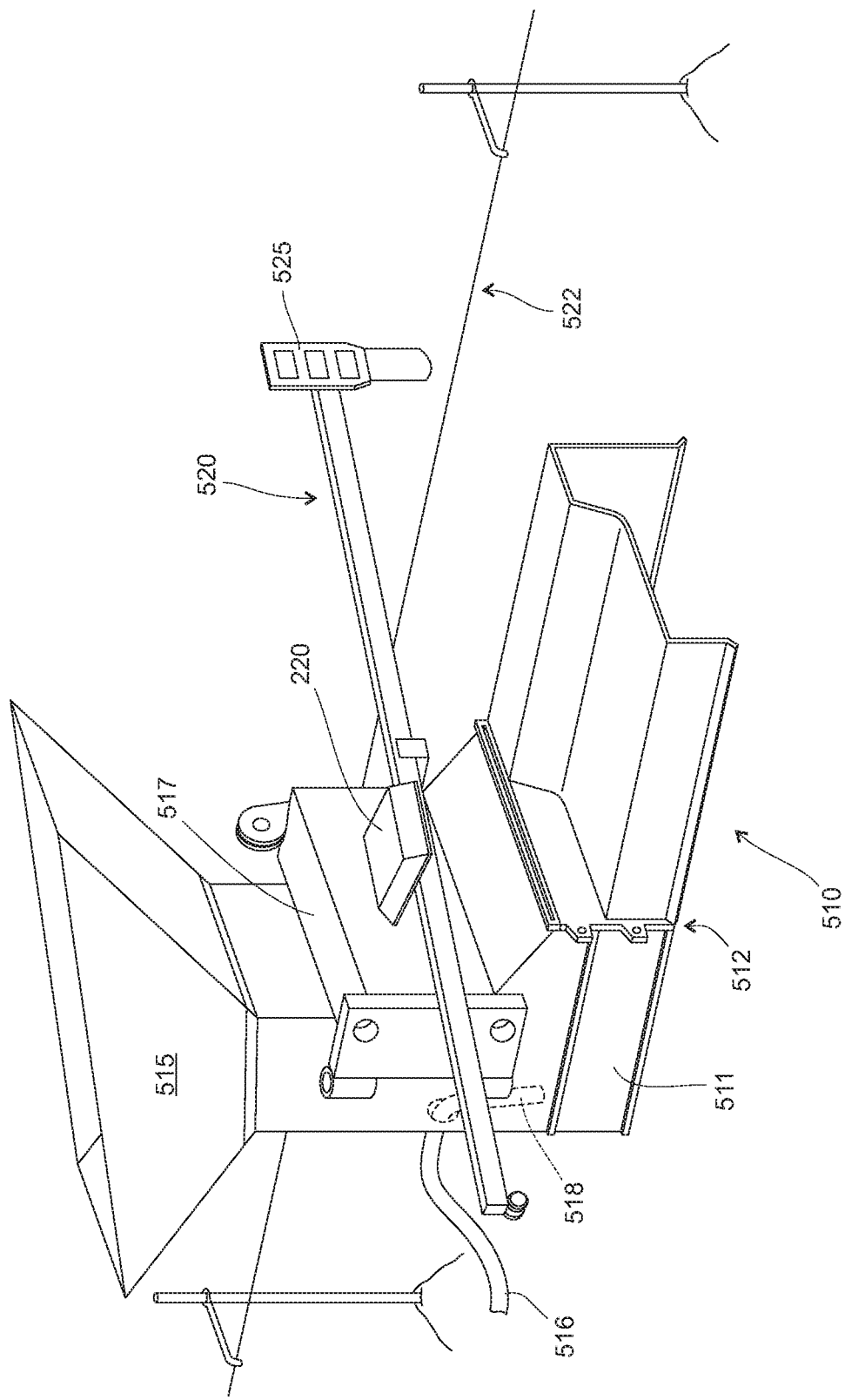
FIG. 6 shows a curb and gutter extruder.

On a road and sidewalk construction job, the first linear acting tool that is useful when mounted on the side tool carrier described above is a curb and gutter extruder as shown in FIG. 6.

Figure 7:
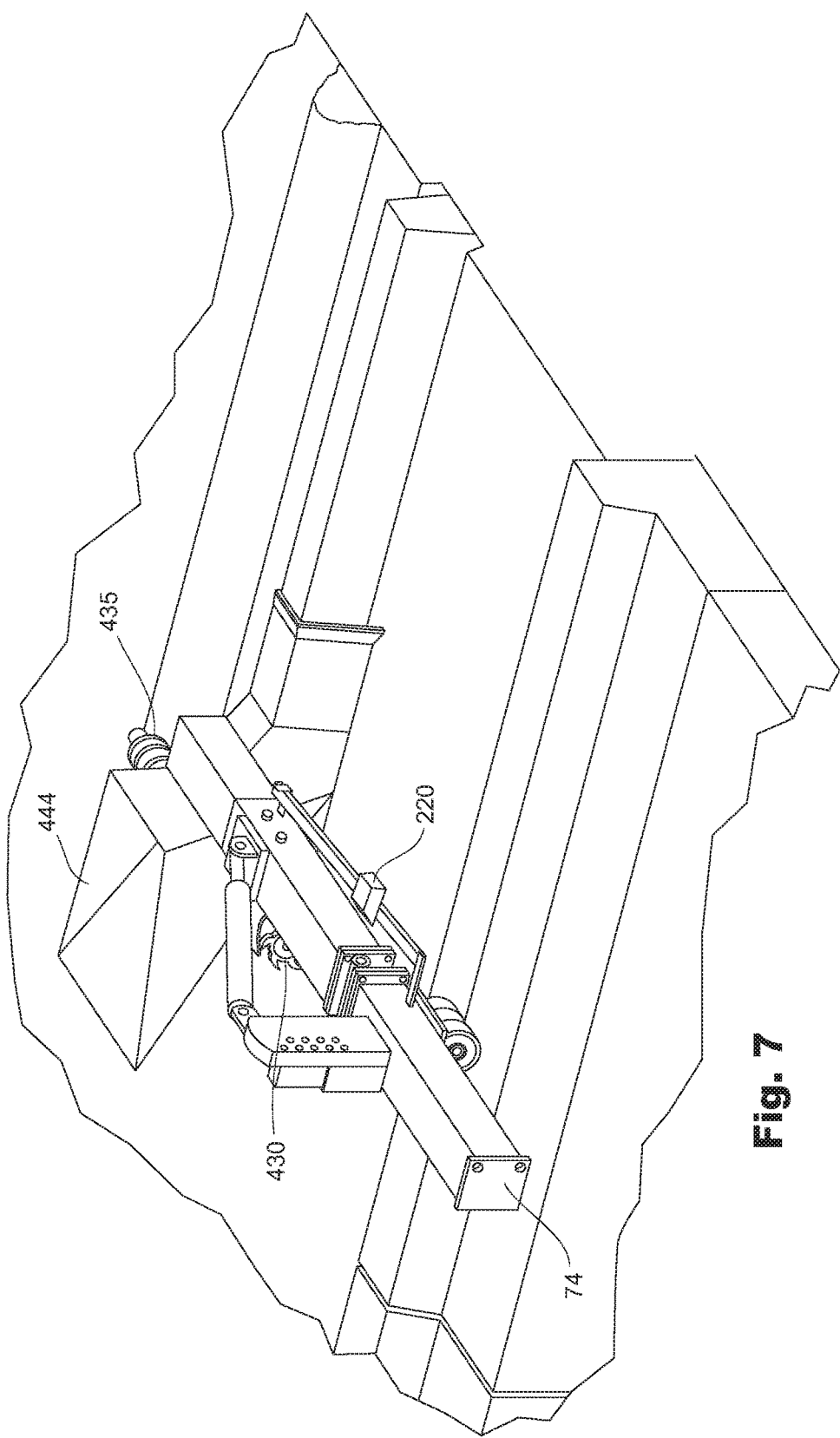
FIG. 7 shows an extruder for a second curb.

After a first curb is extruded and hardened, the extruder head may be changed to extrude a second curb on the far side of the sidewalk grade as shown in FIG. 7. A trimmerhead 430 and auger 435 can be used in conjunction with or ahead of the curb and gutter extruder.

As shown in FIG. 6, a sonar sensor 525 may be set up on an arm 520 to actuate controllers that adjust height and lateral location relative to a string 522 set up as a datum line.

Sidewalk Grader Improvements

The next tool to be used on the job is a sidewalk grader. As an improvement to the prior art grader, the blade width may be made adjustable with a sliding blade extension 304 guided by guide bars 315 and 316 and actuated by a hydraulic cylinder 318 as shown in FIG. 8.

Figure 8:
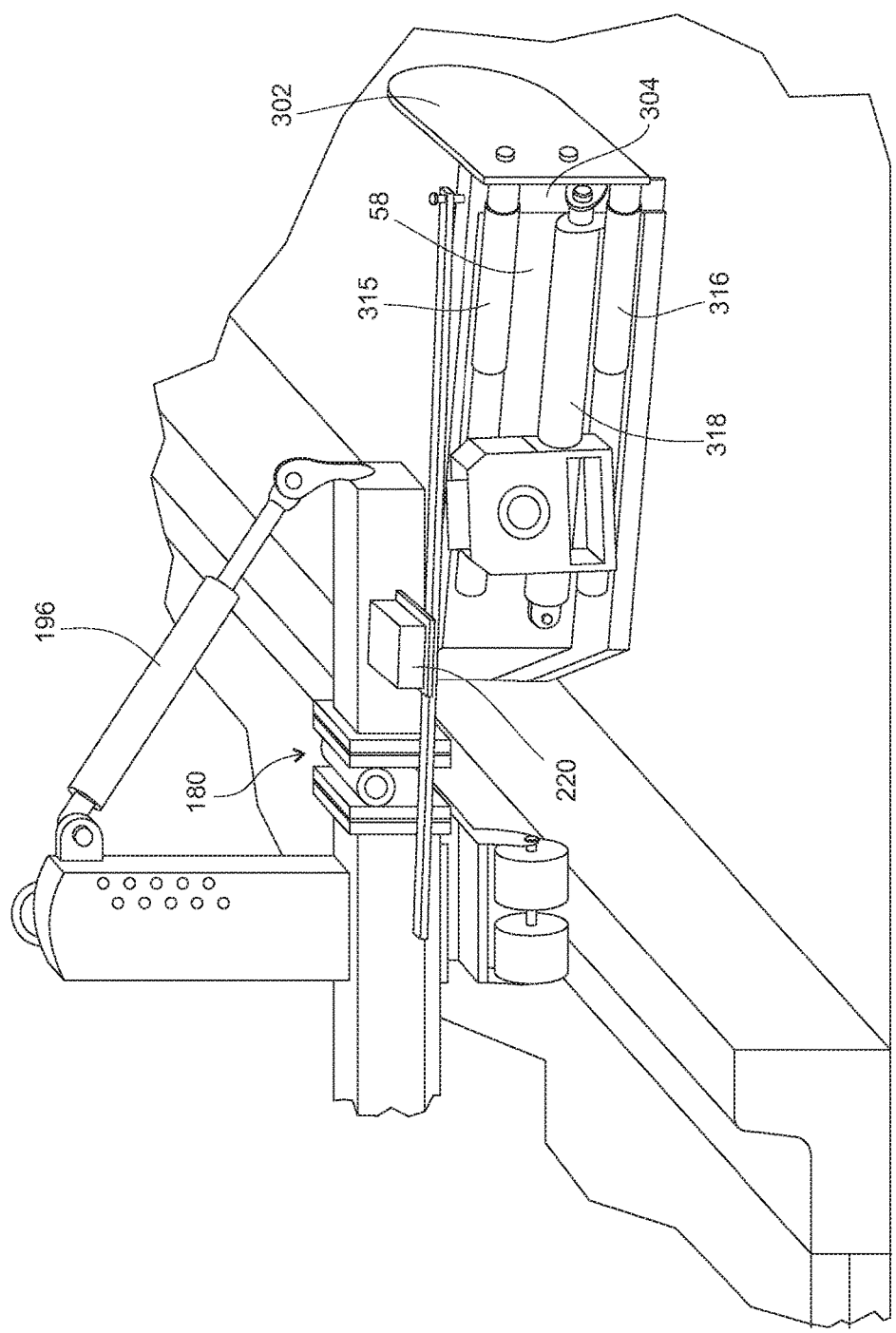
FIG. 8 shows a laterally extendable edge blade.

As another improvement, a detachable fin 302 shown in FIG. 8 may be added to the distant end of the blade.

Figure 9:
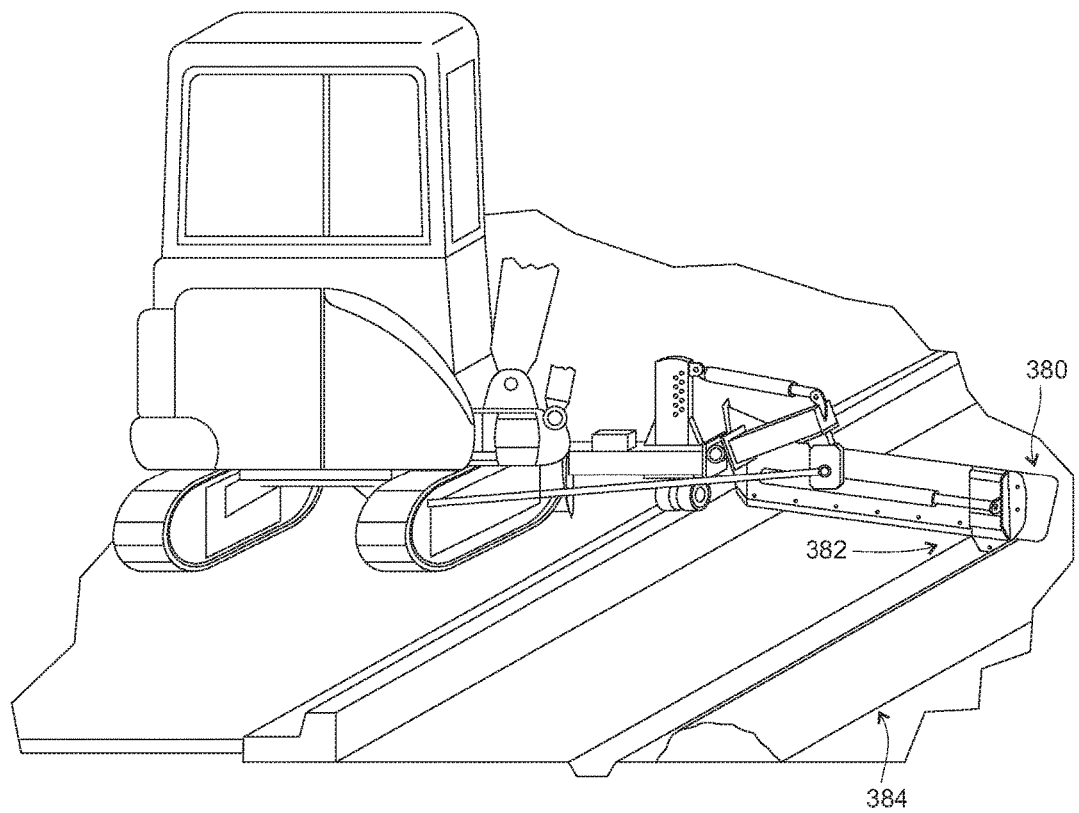
FIG. 9 shows a detachable trencher added to the end of the blade.

As another improvement, a detachable trencher 382 shown in FIG. 9 may be added to the distant end of the blade to create a trench for placing sidewalk edging stones. For use in the same pass, a windrow forming attachment 380 may be added to pile displaced material in a windrow 384.

Figure 10:
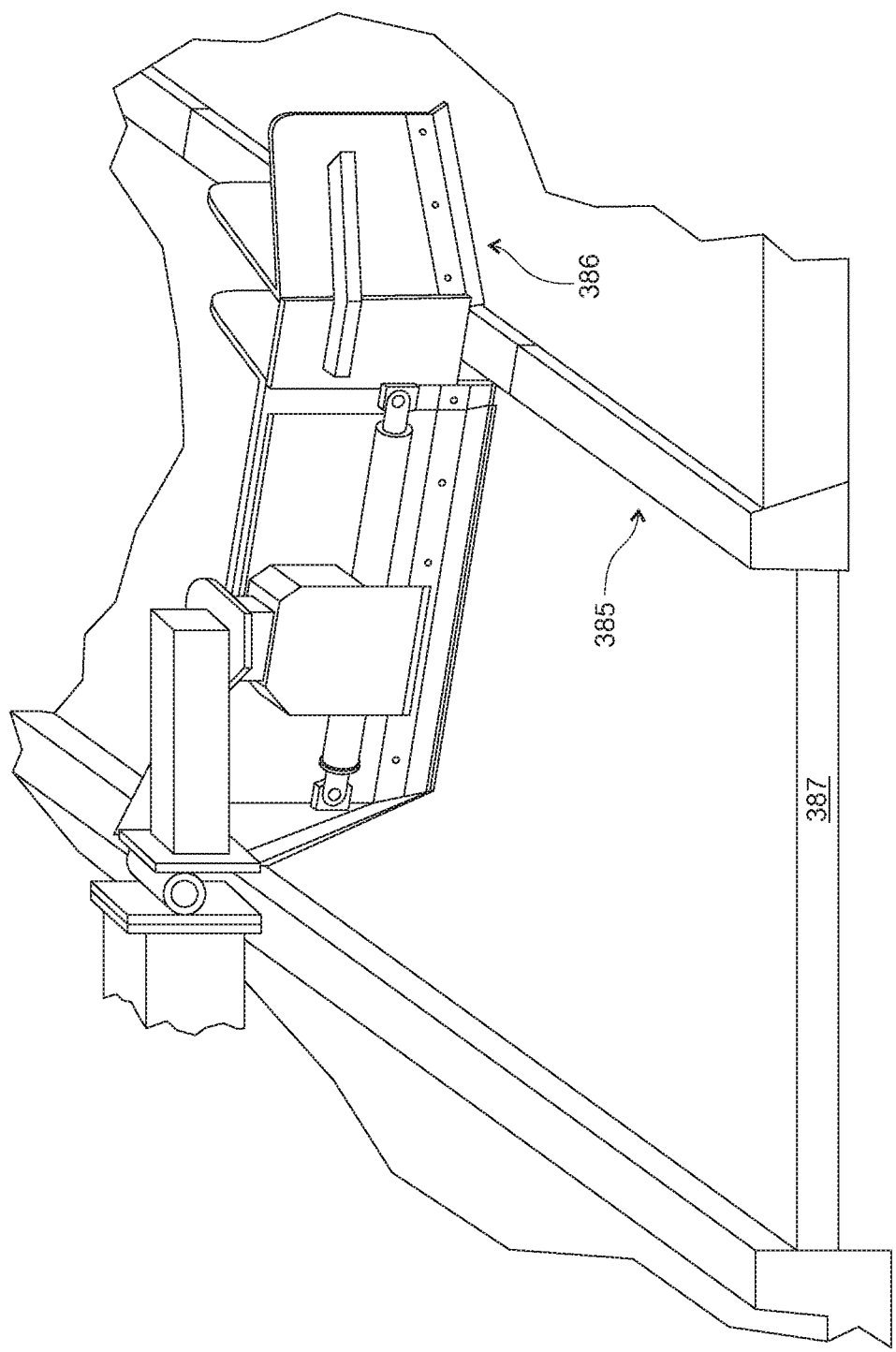
FIG. 10 shows grading base rock with the sidewalk grading blade.

Then a second curb may be extruded as shown in FIG. 7 or sidewalk edging stones 385 may be placed in the trench as shown as shown in FIG. 10. Base rock 387 is then placed in the sidewalk grade, and the base rock is graded with the sidewalk grading blade, as shown in FIG. 10. An edging backfill attachment 386 may be added to the end of the blade to pull the windrow 384 against the edging stones 385 or extruded curb.

Also, a sonar sensing and guiding system may be added to sense the curb top or the gutter or a guide string. A laser sensor may be added to sense a laser beam for guidance.

Paver

Figure 11:
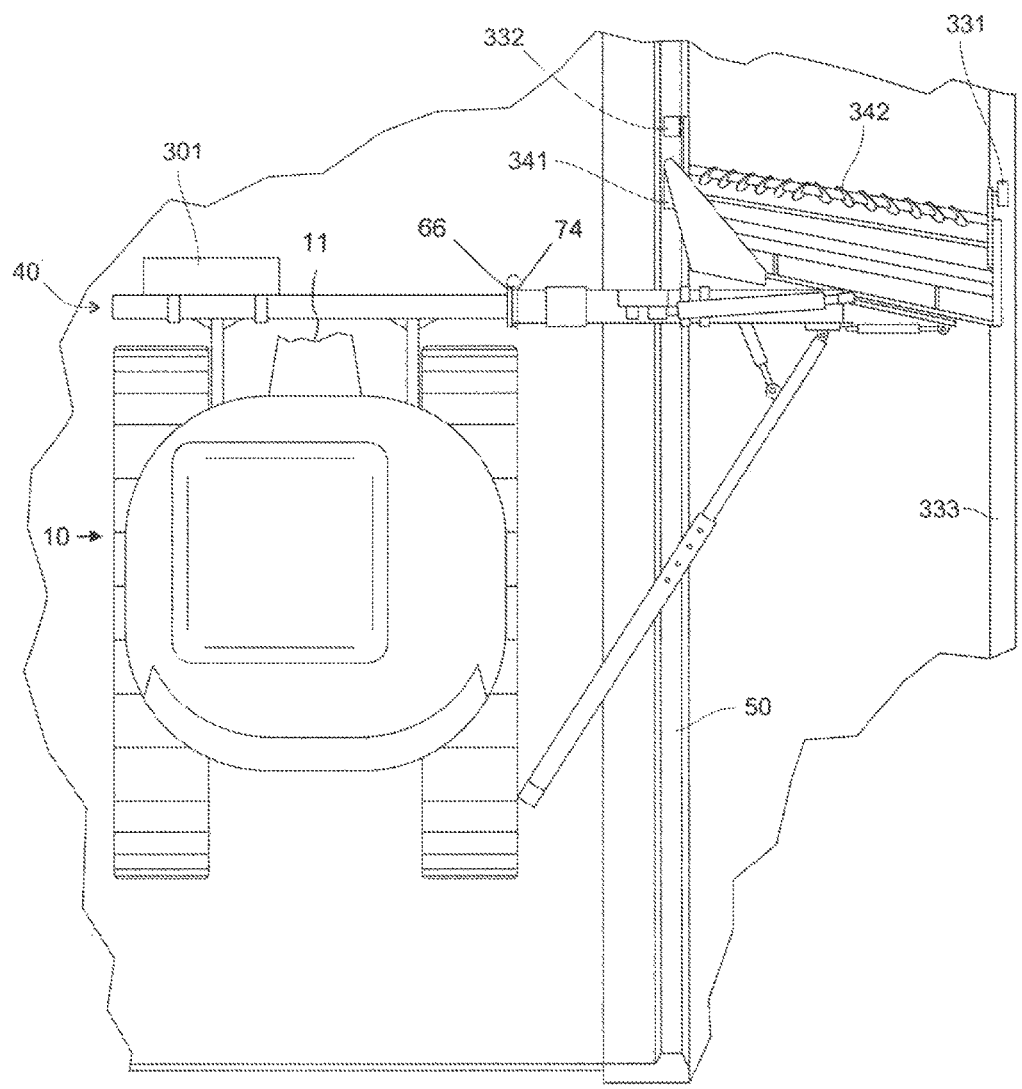
FIG. 11 shows paving with a paver detachable tool.
Figure 12:
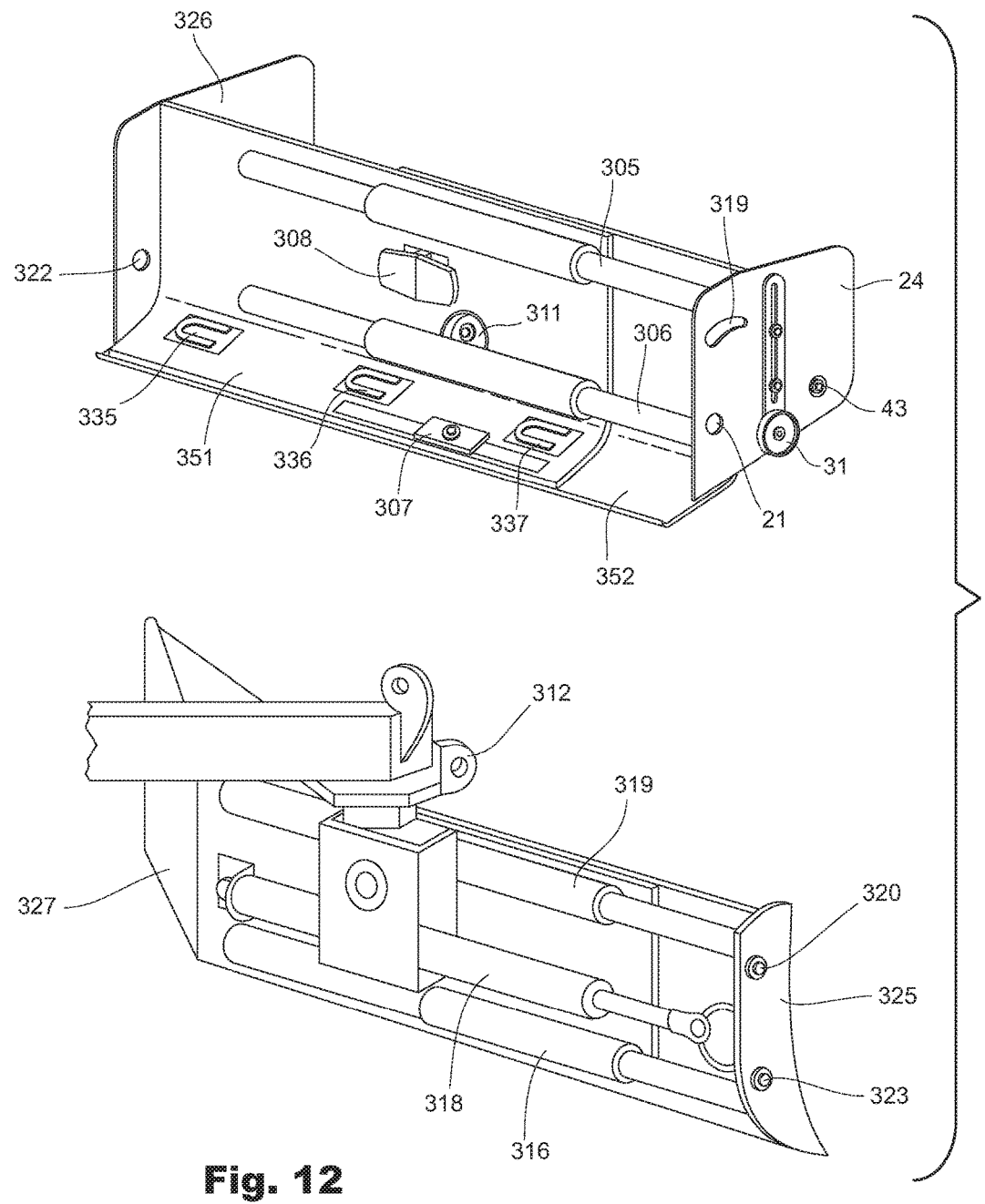
FIGS. 12 and 13 show adjustable tools for paving.
Figure 13:
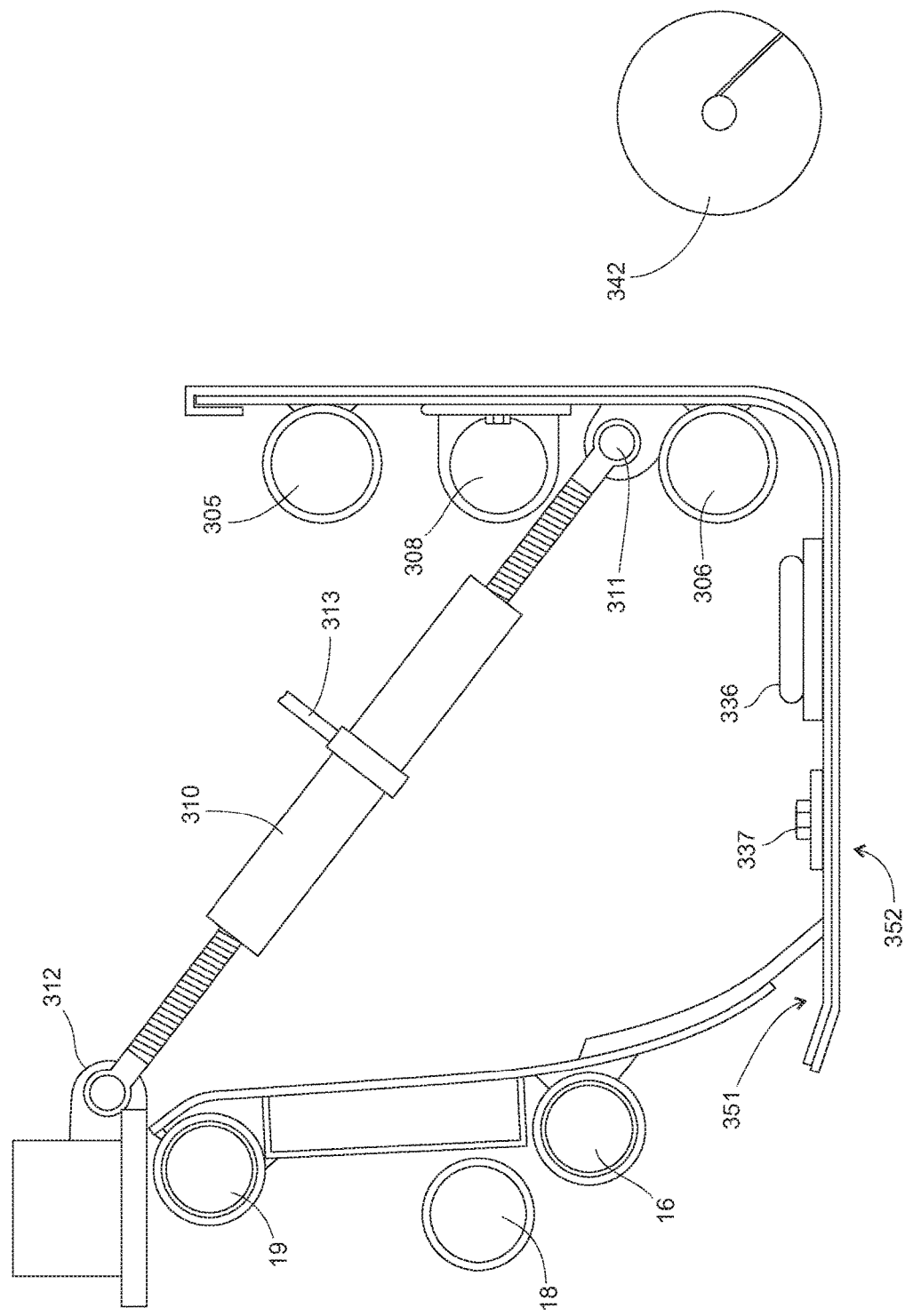

Now the grade is ready for paving with a paver as shown in FIGS. 11, 12, and 13 (cross section). The paver components are attached to the grading blade to add an auger 342 and a smoothing plate 351 plus smoothing plate extension 352. A vibrator 308 helps smooth the material, whether cement or asphalt, and, when used for asphalt, heaters 335, 336, and 337 keep the smoothing plate warm. If electric heaters are used, they may be driven by a generator 301 which may be mounted on the excavator blade 40.

Reel for Auxiliary Hydraulic Hoses

FIGS. 14A, 14C, 15A, 15B and 16A show a hydraulic hose reel 651 adapted to carry two hydraulic hoses in the tool mounting base (which is preferably also an earth moving blade) for connecting any tool that needs hydraulic power.

Horizontally Extendable Side Blade

FIGS. 14B, 14C, 15B, 15C, 15D, 16A, and 16B show a side blade which extends horizontally out of an end of the tool mounting base (which is preferably also an earth moving blade). The side blade 861 is also shown in FIGS. 23, 24, 25 26A, 26B, and 27.

Multi-Coupling Plate

FIG. 3 shows a fixed hydraulic multi-coupling plate 871 and a mating mobile hydraulic multi-coupling plate 870.

FIGS. 16C, 17B, and 17C show a multi-coupling plate 871 mounted on the tool mounting base (which is preferably also an earth moving blade). This prevents hydraulic hoses from being incorrectly coupled. As shown in these figures, it also is engaged by the action of engaging a tool mount 872 with a tool multi-coupling plate 870 onto the mounting base. Thus, one action both attaches the tool and couples hydraulic lines for actuating the tool.

FIGS. 16C and 17C show how retainers 873 of the tool mount 66 may be powered with a hydraulic cylinder 874. The retainers 873 engage and retain steel pins 875 with are part of the tool mount 872. A third pin 876 may be added beside the multi-coupler to ensure alignment:

Tool Attachment Base that Stays Plumb

The tool attachment base 66 is preferably a central earth-moving blade on an excavator. However, as shown in FIG. 18A, the standard blade rotates out of plumb as the blade is raised and lowered. For use of the blade as a tool attachment base, it is preferable to replace the blade with a blade designed to stay plumb as the blade is raised and lowered.

There are two ways to achieve this objective. First, the blade may be designed with upper and lower pivot points connected by arms to upper and lower pivot points on the machine, with the blade pivot points located such that the four pivot points always form a parallelogram. A hydraulic cylinder is then coupled to apply forces to opposite corners of the parallelogram to raise and lower the blade.

Alternatively, the blade may be designed as shown in FIGS. 18B and 19. As shown, a first arm connecting the blade to the machine via couplings 918 and 919 includes an intermediate coupling 901 between a first portion of the arm 912 and a second portion of the arm 913. The first portion is affixed with a pivot 915 to a second arm 914 which couples the blade to the machine via couplings 920 and 921, and the first portion 912 includes a lever arm 917 between the intermediate coupling 911 and the pivot 915 wherein the length and angle of the lever arm is determined so as to constrain the tool attachment base 66 to move up and down without significant rotation out of plumb.

In either case, the design may be described more generally as follows: at least two arms, each having a first end and a second end, with rotatable couplings at the first ends for attaching to the machine; rotatable couplings on the second ends coupled to a tool attachment base; and the at least four couplings each having a location when the attachment base is mounted on a machine via the couplings wherein geometric relationships between the locations of the couplings constrains the tool attachment base to move up and down without significant rotation out of plumb.

Silt Fence Installer

Figure 20:
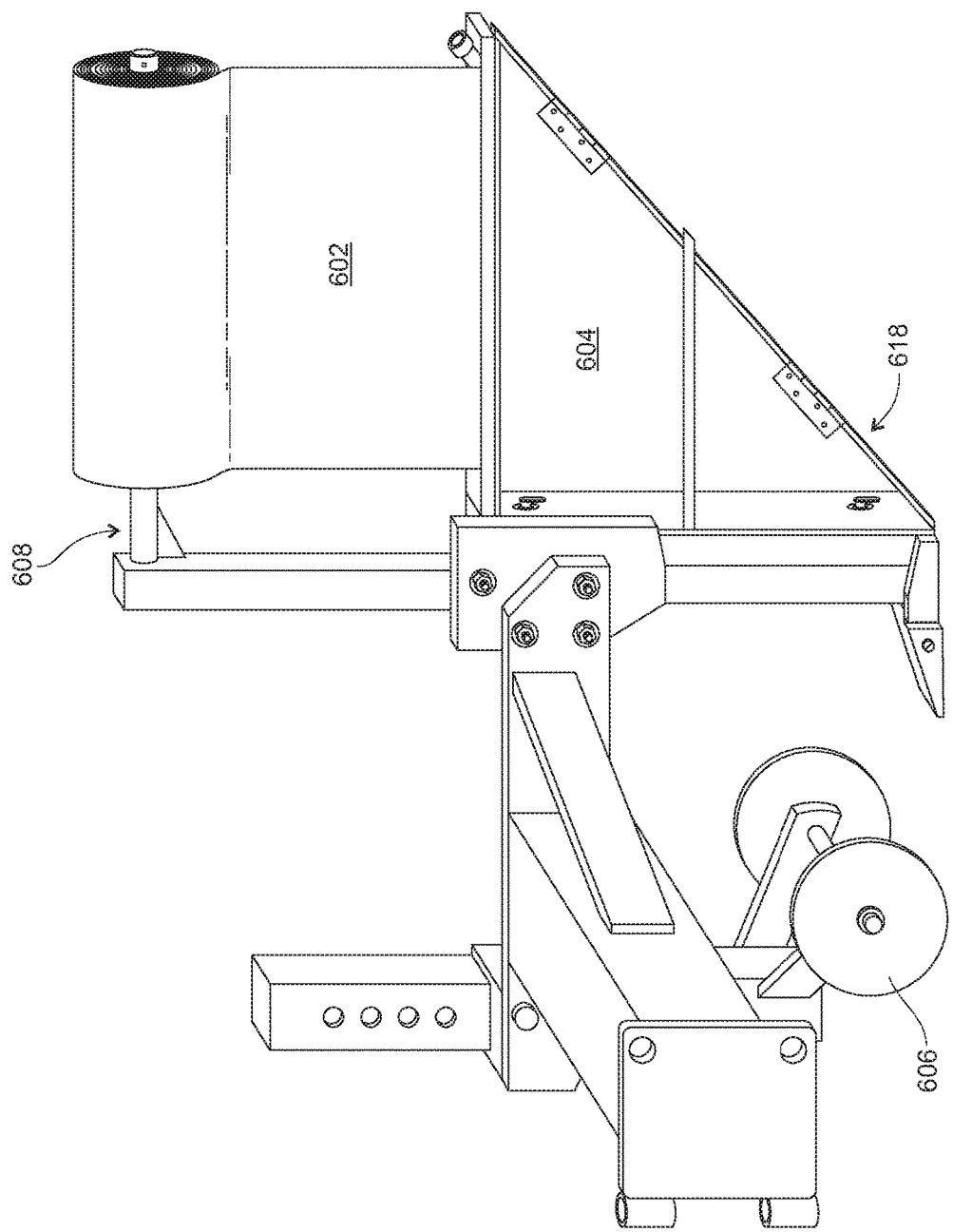

Often when a silt fence must be installed it is important not to disturb ground on one side. The bucket 43 of an excavator is useful for preparing the area while the machine moves forward installing the fence 602 as shown in FIG. 20. The silt fence installer attachment includes a fence roll support bar 608 that supports a roll of fencing material 602. The fencing material is fed off the roll, down around a direction changing diagonal edge (not visible). Surrounding the fencing as it goes around the direction changing edge are two sides 604 of a direction changing chamber. The sides join at a plowing edge 618 that cuts into the ground as the machine moves forward. A skid or wheels 606 may be adjusted up or down to change the depth of the cut made by the plowing edge 618.

Silt Fence with Attached Posts Installer

FIG. 21A shows another form of silt fence installer. In this case, the silt fence is supplied on a roll 801 with stiff posts 802 attached to the fence material every 2-4 feet. The posts extend below the fence material at the bottom by 3-12 inches. A plowing edge 803 digs a trench to a preferred depth for the silt fence material.

As the fencing with posts unrolls, it is inserted into the trench with the post bottoms at the bottom of the trench and the fence material above the bottom by 3-12 inches. Then a post pusher 804 pushes on the tops of the posts to push them into the soil at the bottom of the trench to a preferred depth, typically until the fence material touches the bottom of the trench. Hydraulic cylinders adjust a height of a leading edge of the post pusher and a height of a trailing edge of the post pusher to push the posts to the desired depth.

In a preferred embodiment, a steel U channel with extending fins extends from a trailing edge of the plow 802 to keep the trench open until the fence is seated. A bottom of the U channel supports and guides the post bottoms as they descend to the bottom of the trench. Then the fins hold back soil until the posts are pushed to a desired depth.

Finally, rotatable discs 807 push the soil to close the trench against the fence material.

The same fence installer side-tool attachment can be used to install fences that do not include buried material by setting tool height so that no trench is dug and using fencing where the posts extend below the material by 8-24 inches.

Preferred structure for the fencing material 801 is woven with loose warp and weft parallel and perpendicular to the fence bottom and top so that it will easily skew to parallelogram orientation to allow material coming off the roll to easily descend to installed height and then the material reorients to roughly square as it is seated.

Fence and Non-Attached Posts Installer

Figure 22:
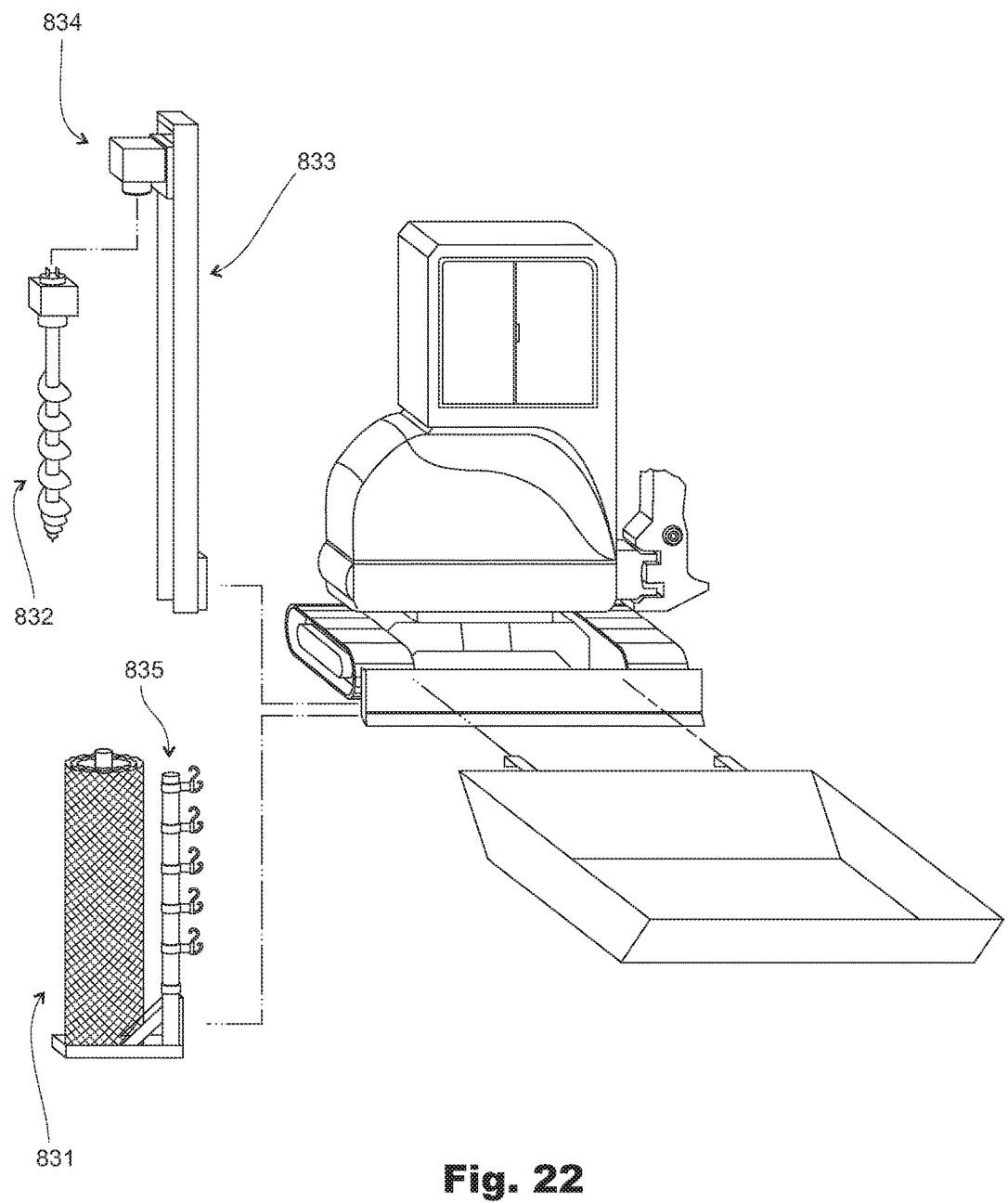

FIG. 22 shows another form of fence installer. In this case, the fence is supplied on a roll 831 without posts. The posts are robust and require an auger 832 mounted on a vertical sliding base 834 mounted on a vertical slide 833 to drill holes, or require a hydraulic post pounding face (not shown)

mounted on the sliding base 834 to pound them in. The attachment may include a fence stretcher 835.

Horizontally Extendable Low Profile Side Blade

Figure 23:
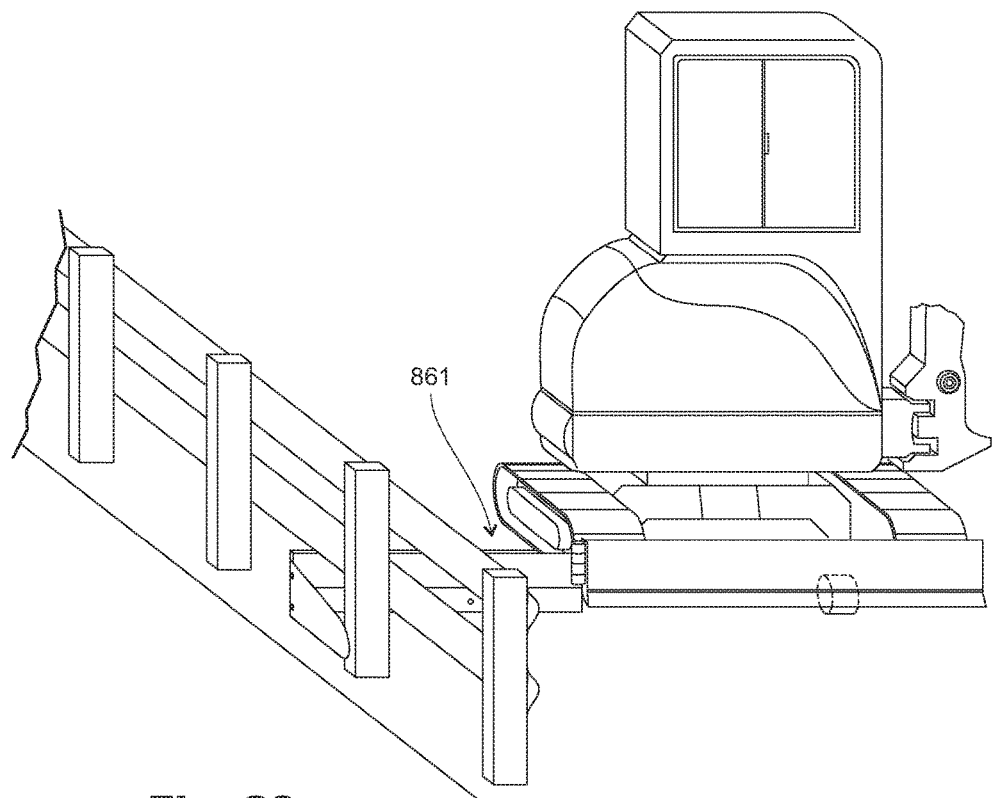
Figure 24:
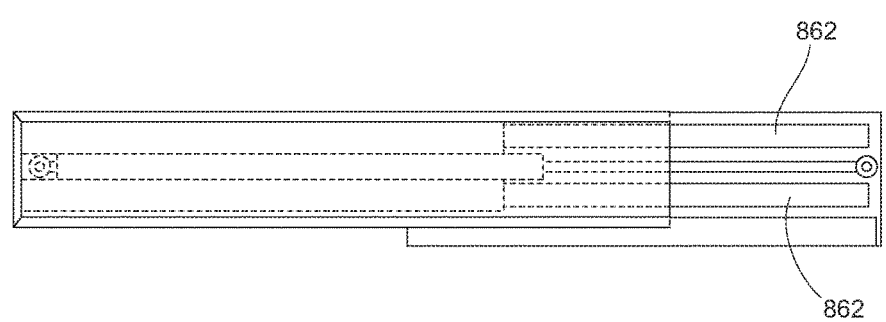
Figure 27:
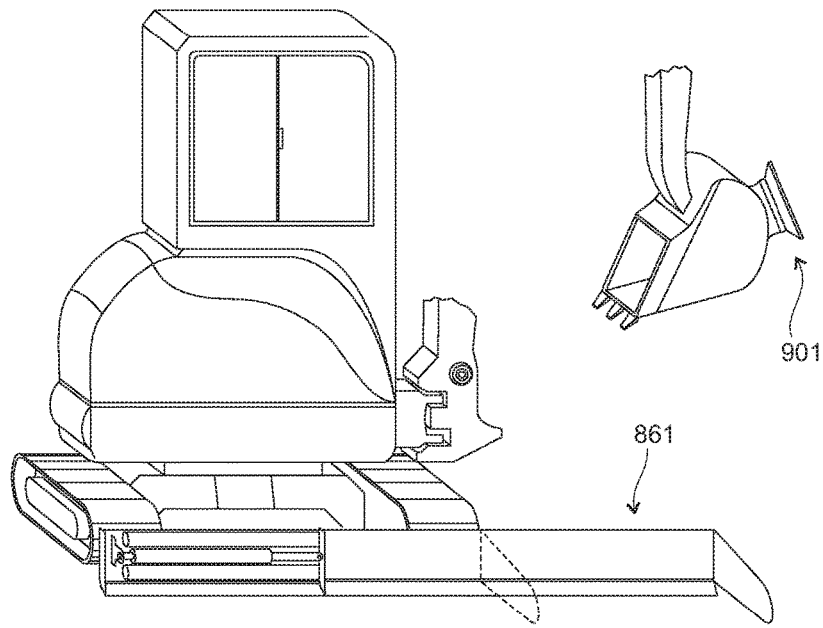
FIG. 27 shows a laterally extendable blade.
Figure 28:
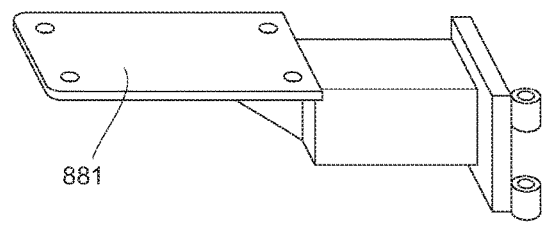
FIGS. 28 and 29 show a trencher attachment.
Figure 29:
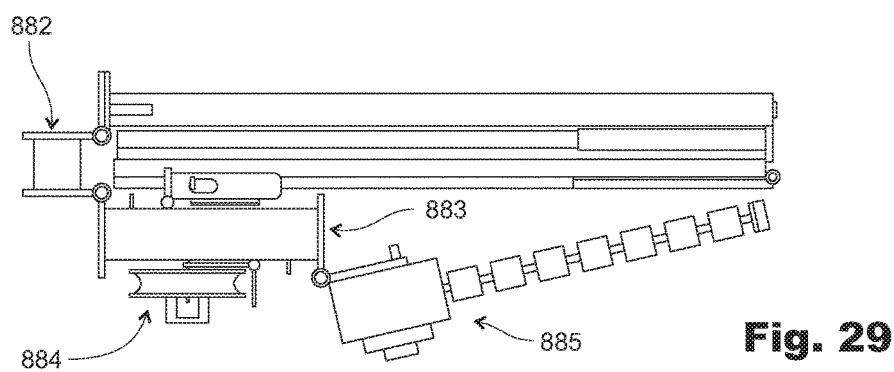
Figure 30:
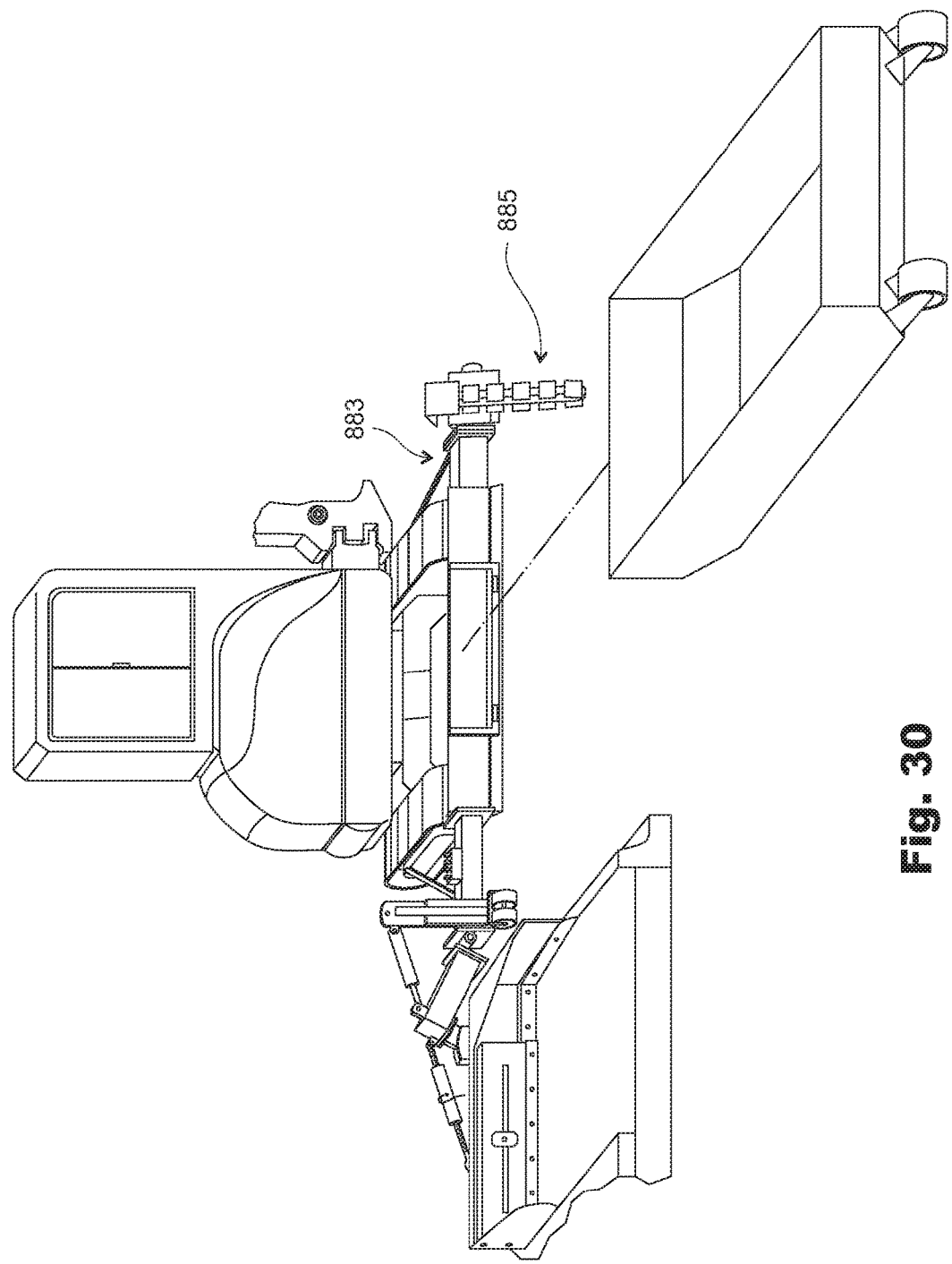
FIG. 30 shows a materials bin attachment.

FIG. 23 shows a horizontally extendable low profile side blade attachment 861 that can clear debris under guard rails. As shown in FIG. 24, the low profile blade slides horizontally in or out using pipe guides 862. A similar horizontally extendable blade 864 is also shown in FIG. 25. The pipes guides 865 are shown in a side view in FIG. 26B, and in a top view in FIG. 26A.

Side Roller

It is sometimes advantageous to be able to roll a surface to one side of a road grade, such as in a sidewalk grade. A side roller attachment, as shown in FIG. 31, mounted on the modified excavator does the job. The roller may include a vibrator 730.

Red Zone Auto Controls

A system with a programmable controller in the cab with a custom graphic display can be used to create a "Red Zone" that the excavator components cannot enter, thereby protecting the tool and people near it or using it. Inclinometers, potentiometers, rotation sensors, and cylinder stroke sensors are some of the means to indicate to the controller the position of the cab, arm 11, boom, and bucket, to enable the machine to stay out of the "Red Zone". When the machine enters the "Red Zone" the pilot valve cuts the oil supply between the excavator control handles and the excavator control valve.

In particular, the controller can be programmed to give specific directions for each attachment using a look-up table for each attachment to specify:

location of "Red Zone", restriction on flow rate and psi of hydraulic oil to each hydraulic actuator, down to zero when appropriate, allowed characteristics of each function of each hydraulic actuator of the excavator or the tool, limitations on or specification of track speed and direction (the Leica Sonar system can read a string line and direct the controller to drive the machine's direction and speed automatically) as with the side grader and the curb and gutter extruder; and alignment of control handle buttons to correspond with attachment functions.

IFM Electronics makes a suitable inclinometer, model EC 2045, and cylinder stroke sensors. They also offer a suitable programmable controller, model CR 1050.

The invention claimed is:

1. A silt fence installing machine wherein an operator can swivel for good view and control an articulating tool to operate in coordination with a silt fence installing tool, comprising:
   (a) a set of wheels or tracks on which the machine rides supporting a support structure;
   (b) coupled to and supported by the support structure, an operator's seat and operator's controls;
   (c) coupled to and supported by the support structure, a vertical swivel such that components coupled to an upper side of the swivel can swivel about a vertical axis relative to the support structure;
   (d) an articulating arm coupled to the upper side of the vertical swivel, controllable by the controls, with an articulatable tool mounted on a distant end of the arm;
   (e) coupled to and supported by the support structure and fixed to a lower side of the swivel, a mounting base for mounting an additional tool;
   (f) a silt fence installer tool mounted on the mounting base such that an operator can, using controls at the operator's seat, control the articulatable tool to perform an operation in coordination with the silt fence installer tool.

2. The system of claim 1 wherein the swivel can fully swivel any number of rotations without limitation.

3. The system of claim 2 wherein elements (a) through (e) are provided by an excavator with the operator's seat and operator's controls coupled to the upper side of the swivel.

4. The system of claim 1 wherein the articulating tool is selected from the group comprising an earth moving bucket, a rake, and a claw.

\* \* \* \* \*